US010741812B2

(12) United States Patent
Luski et al.

(10) Patent No.: US 10,741,812 B2
(45) Date of Patent: Aug. 11, 2020

(54) ACID-SCAVENGING FUNCTIONAL SEPARATORS FOR POWER PERFORMANCE OF LITHIUM ION ELECTROCHEMICAL CELLS

(71) Applicants: GM Global Technology Operations LLC, Detroit, MI (US); Bar-Ilan University, Ramat-Gan (IL)

(72) Inventors: Shalom Luski, Rehovot (IL); Doron Aurbach, Bnei Brak (IL); Timothy J. Fuller, Pittsford, NY (US); Ion C. Halalay, Grosse Pointe Park, MI (US); Anjan Banerjee, West Bengal (IN); Baruch Ziv, Ramat Gan (IL); Raghunathan K, Troy, MI (US)

(73) Assignees: GM GLOBAL TECHNOLOGY OPERATIONS LLC, Detroit, MI (US); BAR-ILAN UNIVERSITY, Ramat Gan (IL)

( * ) Notice: Subject to any disclaimer, the term of this patent is extended or adjusted under 35 U.S.C. 154(b) by 142 days.

(21) Appl. No.: 15/627,376

(22) Filed: Jun. 19, 2017

(65) Prior Publication Data
US 2018/0366781 A1 Dec. 20, 2018

(51) Int. Cl.
*H01M 2/16* (2006.01)
*H01M 10/0568* (2010.01)
(Continued)

(52) U.S. Cl.
CPC ......... *H01M 2/162* (2013.01); *H01M 2/1653* (2013.01); *H01M 2/1666* (2013.01);
(Continued)

(58) Field of Classification Search
CPC ......... H01M 10/0565; H01M 10/0566; H01M 2/16; H01M 2/162; H01M 4/525;
(Continued)

(56) References Cited

U.S. PATENT DOCUMENTS 4,295,952 A * 10/1981 de Nora ................. C08J 5/2287
204/252
5,907,001 A 5/1999 Foucher et al.
(Continued)

FOREIGN PATENT DOCUMENTS

CN 109148796 A 1/2019
DE 102018114605 A1 12/2018
WO WO 2013/147006 * 10/2013 ............. H01M 2/16

OTHER PUBLICATIONS

Machine translation of WO 2013/147006, Oct. 2013 (Year: 2013).*
(Continued)

*Primary Examiner* — Maria Laios
*Assistant Examiner* — Kwang Han
(74) *Attorney, Agent, or Firm* — Harness, Dickey & Pierce P.L.C.

(57) ABSTRACT

Methods of scavenging acid in a lithium-ion electrochemical cell are provided. An electrolyte solution that contains an acid or is capable of forming the acid is contacted with a polymer comprising a nitrogen-containing acid-trapping moiety selected from the group consisting of: an amine group, a pyridine group, and combinations thereof. The nitrogen-containing acid-trapping moiety scavenges acidic species present in the electrolyte solution by participating in a Lewis acid-base neutralization reaction. The electrolyte solution comprises a lithium salt and one or more solvents and is contained in the electrochemical cell that further comprises a first electrode, a second electrode having an opposite polarity from the first electrode, and a porous separator. Lithium ions can be cycled through the separator and electrolyte solution from the first electrode to the second electrode, where acid generated during the cycling is scavenged by the polymer comprising a nitrogen-containing acid-trapping moiety.

15 Claims, 11 Drawing Sheets

(51) Int. Cl.
H01M 4/505 (2010.01)
H01M 10/052 (2010.01)
H01M 4/525 (2010.01)

(52) U.S. Cl.
CPC ......... H01M 2/1686 (2013.01); H01M 4/505 (2013.01); H01M 4/525 (2013.01); H01M 10/052 (2013.01); H01M 10/0568 (2013.01); H01M 2220/20 (2013.01)

(58) Field of Classification Search
CPC .. H01M 10/052; H01M 2/1666; H01M 4/505; H01M 10/0568; H01M 2/1686; H01M 2/1653; H01M 2220/20; H01M 10/0525; H01M 4/13
See application file for complete search history.

(56) References Cited

U.S. PATENT DOCUMENTS

| | | | |
|---|---|---|---|
| 8,455,140 | B1 | 6/2013 | Huang et al. |
| 8,460,591 | B2 | 6/2013 | Huang et al. |
| 8,460,829 | B1 | 6/2013 | Huang et al. |
| 8,470,468 | B2 | 6/2013 | Xiao et al. |
| 8,470,898 | B2 | 6/2013 | Huang |
| 8,568,930 | B2 | 10/2013 | Halalay et al. |
| 8,765,301 | B2 | 7/2014 | Halalay et al. |
| 8,785,054 | B2 | 7/2014 | Halalay et al. |
| 8,835,058 | B2 | 9/2014 | Kia et al. |
| 8,951,654 | B2 | 2/2015 | Sachdev et al. |
| 8,993,646 | B2 | 3/2015 | Huang |
| 9,028,565 | B2 | 5/2015 | Huang |
| 9,138,932 | B2 | 9/2015 | Huang |
| 9,172,075 | B2 | 10/2015 | Kia et al. |
| 9,786,947 | B2 * | 10/2017 | Yushin .................. H01M 4/628 |
| 2012/0102725 | A1 | 5/2012 | Fuller et al. |
| 2012/0231321 | A1 | 9/2012 | Huang et al. |
| 2012/0244427 | A1 * | 9/2012 | Hashimoto ............. C08F 16/14 429/200 |
| 2012/0308872 | A1 | 12/2012 | Huang |
| 2012/0315384 | A1 | 12/2012 | Abd Elhamid et al. |
| 2013/0004857 | A1 | 1/2013 | Kia et al. |
| 2013/0052509 | A1 | 2/2013 | Halalay et al. |
| 2013/0319599 | A1 | 12/2013 | Huang |
| 2014/0220233 | A1 | 8/2014 | Huang et al. |
| 2014/0242452 | A1 | 8/2014 | Pieczonka et al. |
| 2014/0272526 | A1 | 9/2014 | Huang |
| 2015/0037651 | A1 | 2/2015 | Huang |
| 2015/0056492 | A1 | 2/2015 | Huang |
| 2017/0155175 | A1 | 6/2017 | Halalay et al. |

OTHER PUBLICATIONS

Anjan Banerjee et al.; "Increasing the Durability of Li-ion Batteries by Means of Manganese Ion Trapping Materials with Nitrogen Functionalities"; Journal of Power Sources 341 (2017); Dec. 10, 2016; pp. 457-465.

Anjan Banerjee et al.; "Improving Stability of Li-Ion Batteries by Means of Transition Metal Ions Trapping Separators"; Journal of the Electrochemical Society, 163 (6); Mar. 29, 2016; pp. A1083-A1094.

Anjan Banerjee et al.; "Multifunctional Manganese Ions Trapping and Hydrofluoric Acid Scavenging Separator for Lithium Ion Batteries Based on Poly (ethylene-alternate-maleic acid) Dilithium Salt"; Advanced Energy Materials, www.MaterialsViews.com; 2016; 9 pages.

Anjan Banerjee et al.; "Review-Multifunctional Materials for Enhanced Li-Ion Batteries Durability: A Brief Review of Practical Options"; Journal of the Electrochemical Society, 164 (1); Jan. 5, 2017; pp. A6315-A6323.

Shalom Luski et al.; U.S. Appl. No. 15/186,526, filed Jun. 19, 2016 entitled "Lithium Ion Battery"; 74 pages.

Anjan Banerjee et al.; "Reducing the High Temperature Performance Degradation in Li-Ion Batteries by Using Ion-Trapping Separators"; IMLB; 18th International Meeting on Lithium Batteries; Jun. 20, 2016; 3 pages. Proceedings Abstract and Poster Presentation.

Alexandratos, Spiro D. et al., "Amination of Poly(vinylenzysl chloride) with N,N-Dimethylformamide," Macromolecules, 36 (9), pp. 3436-3439; DOI: 10.1021/ma0215767 (Apr. 10, 2003) (Abstract Only).

Hahn, Stephen F., "An improved method for the miimide hydrogenation of butadiene and isoprene contianing polymers," Journal of Polymer Science Part A: Polymer Chemistry, 30, (3) pp. 397-408; DOI: 10.1002/pola.1992.080300307 (Published Mar. 15, 1992) (Abstract Only).

Lloyd, W. G. et al., "Nucleophilic displacements upon poly(vinylbenzyl chloride)" Journal of Applied Polymer Science, 7 (6) pp. 2025-2033; DOI: 10.1002/app.1963.070070606 (Nov. 1963) (Abstract Only).

Tang, Yiming et al., "Preparation of Monodispersed Core-Shell Microspheres with Surface Antibacterial Property Employing N-(4-vinylbenzyl)-N,N-diethylamine Hydrochloride as Surfmer," International Journal of Polmyeric Materials, 65 (3) pp. 143-150; DOI: 10.1080/00914037.2015.1074913 (Published online: Sep. 18, 2015) (Abstract Only).

Arora, Pankaj et al., "Battery Separators," Chem. Rev. 2004, 104 (10) pp. 4419-4462; DOI: 10.1021/cr020738u (Published online: Oct. 13, 2004).

Banerjee, Anjan et al., "Acid-Scavenging Separators: A novel route for improving Li-ion batteries' durability", ACS Energy Lett, 2 (2017) pp. 2388-2393, DOI: 10.1021/acsenergylett.7b00763.

Shilina, Yulina et al., "LNMO-graphite cells performance enhancement by the use of acid scavenging separators," ChemElectroChem, 6(14), pp. 3690-3698; (Published Jun. 26, 2019) DOI: 10.1002/celc.201900907.

* cited by examiner

ACID-SCAVENGING FUNCTIONAL SEPARATORS FOR POWER PERFORMANCE OF LITHIUM ION ELECTROCHEMICAL CELLS

INTRODUCTION

This section provides background information related to the present disclosure which is not necessarily prior art.

The present disclosure relates to use of a polymer including a nitrogen-containing acid scavenging moiety in lithium ion electrochemical cells to scavenge acid and may be incorporated into acid-scavenging functional separators or electrodes for improved power performance of lithium ion electrochemical cells.

High-energy density, electrochemical cells, such as lithium-ion batteries can be used in a variety of consumer products and vehicles. Typical lithium-ion batteries comprise a first electrode, a second electrode, an electrolyte material, and a separator. One electrode serves as a positive electrode or cathode and another serves as a negative electrode or anode. A stack of lithium-ion battery cells may be electrically connected to increase overall output. Conventional rechargeable lithium-ion batteries operate by reversibly passing lithium ions back and forth between the negative electrode and the positive electrode. A separator and an electrolyte are disposed between the negative and positive electrodes. The electrolyte is suitable for conducting lithium ions and may be in solid or liquid form. Lithium ions move from a cathode (positive electrode) to an anode (negative electrode) during charging of the battery, and in the opposite direction when discharging the battery.

The electrolyte typically contains one or more lithium salts, which may be dissolved and ionized in one or more non-aqueous solvents. The negative electrode typically includes a lithium insertion material or an alloy host material. Typical electroactive materials for forming an anode include lithium-graphite intercalation compounds, lithium-silicon intercalation compounds, lithium-tin intercalation compounds, lithium alloys and lithium titanate $Li_{4+x}Ti_5O_{12}$, where $0 \leq x \leq 3$, such as $Li_4Ti_5O_{12}$ (LTO).

Positive electrode materials for lithium batteries include an electroactive material which can be intercalated or alloyed with lithium ions, which may comprise one or more transition metals, such as manganese, nickel, cobalt, chromium, iron, vanadium, and combinations thereof. Such active materials may include, by way of non-limiting example, lithium-transition metal oxides or mixed oxides of the spinel type, for example including spinel lithium manganese oxide ($LiMn_2O_4$), $LiCoO_2$, $LiNiO_2$, $LiMn_{1.5}Ni_{0.5}O_4$, $LiNi_{(1-x-y)}Co_xM_yO_2$ (where $0<x<1$, $0<y<1$, and M may be Al, Mn, or the like), or lithium iron phosphates. Lithium transition metal based oxides, especially lithium manganese-based oxides like spinel $LiMn_2O_4$, $LiMn_{0.33}Ni_{0.33}Co_{0.33}O_2$, $LiMn_{1.5}Ni_{0.5}O_4$, and Li-rich oxygen-deficient mixed Mn—Ni—Co oxide materials with layered-layered structures, are promising active cathode materials for lithium-ion batteries as power sources, especially in Hybrid Electric Vehicles (HEVs) and Electric Vehicles (EVs). These materials have been extensively studied as positive electrode materials because of their lower costs, high rate capability, and higher thermal stability as compared with traditional $LiCoO_2$.

However, there remain certain outstanding challenges to using these types of active materials in lithium-ion batteries, especially in electric vehicles. For example, use of such positive electrode materials can result in capacity fade, especially when the positive electrode comprises manganese-containing materials, which has prevented their widespread commercial use, especially in vehicle applications. Advanced Li-ion batteries for electric or hybrid vehicle applications desirably can achieve at least 10 years of service life. The successful expansion of Li-ion batteries from applications in consumer electronics to electrochemical propulsion will require significant improvements in features like specific and volumetric energy contents, power performance and durability. It would be desirable to provide durable, long-lifetime lithium-ion batteries that avoid or minimize capacity fade and loss, while having high rate capability, high current efficiency, and higher thermal stability.

SUMMARY

This section provides a general summary of the disclosure, and is not a comprehensive disclosure of its full scope or all of its features.

The present disclosure provides methods of scavenging acid in a lithium-ion electrochemical cell. In one variation, the method may include contacting an electrolyte that contains an acid or is capable of forming the acid with a polymer including a nitrogen-containing acid-trapping moiety. The nitrogen-containing acid-trapping moiety is selected from the group consisting of: an amine group, a pyridine group, and combinations thereof. The nitrogen-containing acid-trapping moiety scavenges acidic species present in the electrolyte solution by participating in a Lewis acid-base neutralization reaction. The electrolyte solution includes a lithium salt and one or more solvents and is contained in the electrochemical cell that further includes a first electrode, a second electrode having an opposite polarity from the first electrode, and a porous separator. The method further includes cycling lithium ions through the separator and electrolyte solution between the first electrode and the second electrode, where the acidic species generated is scavenged by the polymer including a nitrogen-containing acid-trapping moiety.

In one aspect, the nitrogen-containing acid-trapping moiety is selected from the group consisting of: 2-vinylpyridine, 3-vinylpyridine, 4-vinylpyridine, dimethylaminomethylstyrene, diethylaminomethylstyrene, vinylpyridine-4-acetamide, vinylphenanthroline, vinylphenylenediamine, 1,10-phenanthroline, vinyl-1,10-phenanthroline, 1,10-phenanthroline-5,6-dione, vinyl-1,10-phenanthroline-5,6-dione, (dimethylamino)pyridine, alkyleneamines, 7-azaindole-pyridine vinyl(dimethylaminomethyl)pyridine, tolylpyridine, oxyalkyl-pyridine, vinyl(diethylaminomethyl)pyridine, 4-(dimethylamino)pyridine, 2-(3-aminophenyl) pyridine, 1,8-naphthyridine, poly(2,3,5,6-pyridine), poly(2,5-pyridine), poly(3,5-pyridine), poly(isopropenylpyridine), poly(4-(dimethylaminomethyl)vinylpyridine), poly[2-(3-aminophenyl)pyridine], poly(1,8-naphthyridine), poly(2,3,5,6-pyridine), poly(2,5-pyridine), poly(3,5-pyridine), dialkylamines, including poly(divinylbenzene-co-vinylbenzyldimethylamine) and poly(divinylbenzene-co-vinylbenzyldiethylamine), isomers and derivatives thereof isomers and combinations thereof.

In one aspect, the polymer is formed from a monomer selected from the group consisting of: vinyl alcohol, vinyl acetate, divinylbenzene, styrene, α-methyl styrene, isoprene, butadiene, propylene, ethylene, acetylene, ethylene, propylene, butylene, isobutylene, ethylene oxide, propylene oxide, ethyleneimine, methyl methacrylate, t-butyl methacrylate, methacrylic acid, ε-caprolactone, dimethylsiloxane, n-butyl methacrylate, vinylidene fluoride, vinyl fluoride, and tetrafluoroethylene, co-polymers, derivatives, and combinations thereof.

In one aspect, the polymer includes divinylbenzene and the nitrogen-containing acid-trapping moiety includes 4-vinylpyridine.

In one aspect, the polymer including a nitrogen-containing acid-trapping moiety includes from greater than or equal to about 40% to less than or equal to about 100% by mass 4-vinylpyridine and greater than or equal to about 0% to less than or equal to about 40% cross-linked divinylbenzene.

In one aspect, the at least one electrode includes a transition metal compound including a transition metal selected from the group consisting of nickel, cobalt, chromium, manganese, iron, vanadium, and combinations thereof, wherein the nitrogen-containing acid-trapping moiety selectively binds to the acid, but does not bind to the transition metal compound.

In one aspect, the first electrode includes manganese and the lithium salt includes lithium hexafluorophosphate. The lithium-ion electrochemical cell is capable of retaining 80% of its initial charge capacity after 100 cycles during cycling with 100% depth-of discharge at a rate corresponding to 3 hours charging or discharging time.

In one aspect, the nitrogen-containing acid-trapping moiety is provided in one or more of the following:

the nitrogen-containing acid-trapping moiety is grafted as a pendant group onto a polymer forming the porous separator;

the polymer including the nitrogen-containing acid-trapping moiety is coated on or disposed within pores of the porous separator;

the polymer including the nitrogen-containing acid-trapping moiety is coated on or disposed within pores of the first electrode;

the nitrogen-containing acid-trapping moiety is grafted as a pendant group onto a binder in the first electrode;

the polymer including the nitrogen-containing acid-trapping moiety is coated on or disposed within pores of the second electrode; or the nitrogen-containing acid-trapping moiety is grafted as a pendant group onto a binder in the second electrode.

In one aspect, the polymer including the nitrogen-containing acid-trapping moiety is a homopolymer.

The present disclosure further provides an electrochemical device including a first electrode; a second electrode having an opposite polarity from the first electrode; a porous separator; an electrolyte including an acid or a component capable of forming an acid, a lithium salt, and one or more solvents; and a polymer including an acid trapping moiety including a nitrogen-containing group. The nitrogen-containing group is selected from an amine group, a pyridine group, or combinations thereof, wherein the acid trapping moiety is capable of participating in a Lewis acid-base neutralization reaction with the acid. At least one of the first electrode, second electrode, or separator includes the polymer.

In one aspect, the nitrogen-containing acid-trapping moiety includes 4-vinylpyridine.

In one aspect, the polymer includes divinylbenzene and the nitrogen-containing acid-trapping moiety includes vinylpyridine.

In one aspect, the polymer is formed from a monomer selected from the group consisting of: vinyl alcohol, vinyl acetate, divinylbenzene, styrene, α-methyl styrene, isoprene, butadiene, propylene, ethylene, acetylene, ethylene, propylene, butylene, isobutylene, ethylene oxide, propylene oxide, ethyleneimine, methyl methacrylate, t-butyl methacrylate, methacrylic acid, ε caprolactone, dimethylsiloxane, n-butyl methacrylate, vinylidene fluoride, vinyl fluoride, and tetrafluoroethylene, co-polymers, derivatives, and combinations thereof.

In one aspect, the nitrogen-containing acid-trapping moiety is selected from the group consisting of: 2-vinylpyridine, 3-vinylpyridine, 4-vinylpyridine, dimethylaminomethylstyrene, diethylaminomethylstyrene, vinylpyridine-4-acetamide, vinylphenanthroline, vinylphenylenediamine, 1,10-phenanthroline, vinyl-1,10-phenanthroline, 1,10-phenanthroline-5,6-dione, vinyl-1,10-phenanthroline-5,6-dione, (dimethylamino)pyridine, alkyleneamines, 7-azaindole-pyridine vinyl(dimethylaminomethyl)pyridine, tolylpyridine, oxyalkyl-pyridine, vinyl(diethylaminomethyl)pyridine, 4-(dimethylamino)pyridine, 2-(3-aminophenyl) pyridine, 1,8-naphthyridine, poly(2,3,5,6-pyridine), poly(2,5-pyridine), poly(3,5-pyridine), poly(isopropenylpyridine), poly(4-(dimethylaminomethyl)vinylpyridine), poly[2-(3-aminophenyl)pyridine], poly(1,8-naphthyridine), poly(2,3,5,6-pyridine), poly(2,5-pyridine), poly(3,5-pyridine), dialkylamines, including poly(divinylbenzene-co-vinylbenzyldimethylamine) and poly(divinylbenzene-co-vinylbenzyldiethylamine), isomers and derivatives thereof isomers and combinations thereof.

In one aspect, the polymer including a nitrogen-containing group includes from greater than or equal to about 40% to less than or equal to about 100% by mass 4-vinylpyridine and greater than or equal to about 0% to less than or equal to about 40% cross-linked divinylbenzene.

In one aspect, the polymer including an acid trapping moiety including a nitrogen-containing group is a homopolymer.

In one aspect, the at least one electrode includes a transition metal selected from the group consisting of nickel, cobalt, chromium, manganese, iron, vanadium, and combinations thereof, wherein the nitrogen-containing acid-trapping moiety selectively binds to the acid, but does not bind to the transition metal.

In one aspect, the first electrode includes manganese and the lithium salt includes lithium hexafluorophosphate. The lithium-ion electrochemical cell is capable of retaining 80% of its initial charge capacity after 100 cycles during cycling with 100% depth-of discharge at a rate corresponding to 3 hours charging or discharging time.

In one aspect, the polymer including the acid trapping moiety including a nitrogen-containing group is provided in one or more of the following:

the nitrogen-containing acid-trapping moiety is grafted as a pendant group onto a polymer forming the porous separator;

the polymer including the nitrogen-containing acid-trapping moiety is coated on or disposed within pores of the porous separator;

the polymer including the nitrogen-containing acid-trapping moiety is coated on or disposed within pores of the first electrode;

the nitrogen-containing acid-trapping moiety is grafted as a pendant group onto a binder in the first electrode;

the polymer including the nitrogen-containing acid-trapping moiety is coated on or disposed within pores of the second electrode; or the nitrogen-containing acid-trapping moiety is grafted as a pendant group onto a binder in the second electrode.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 5:
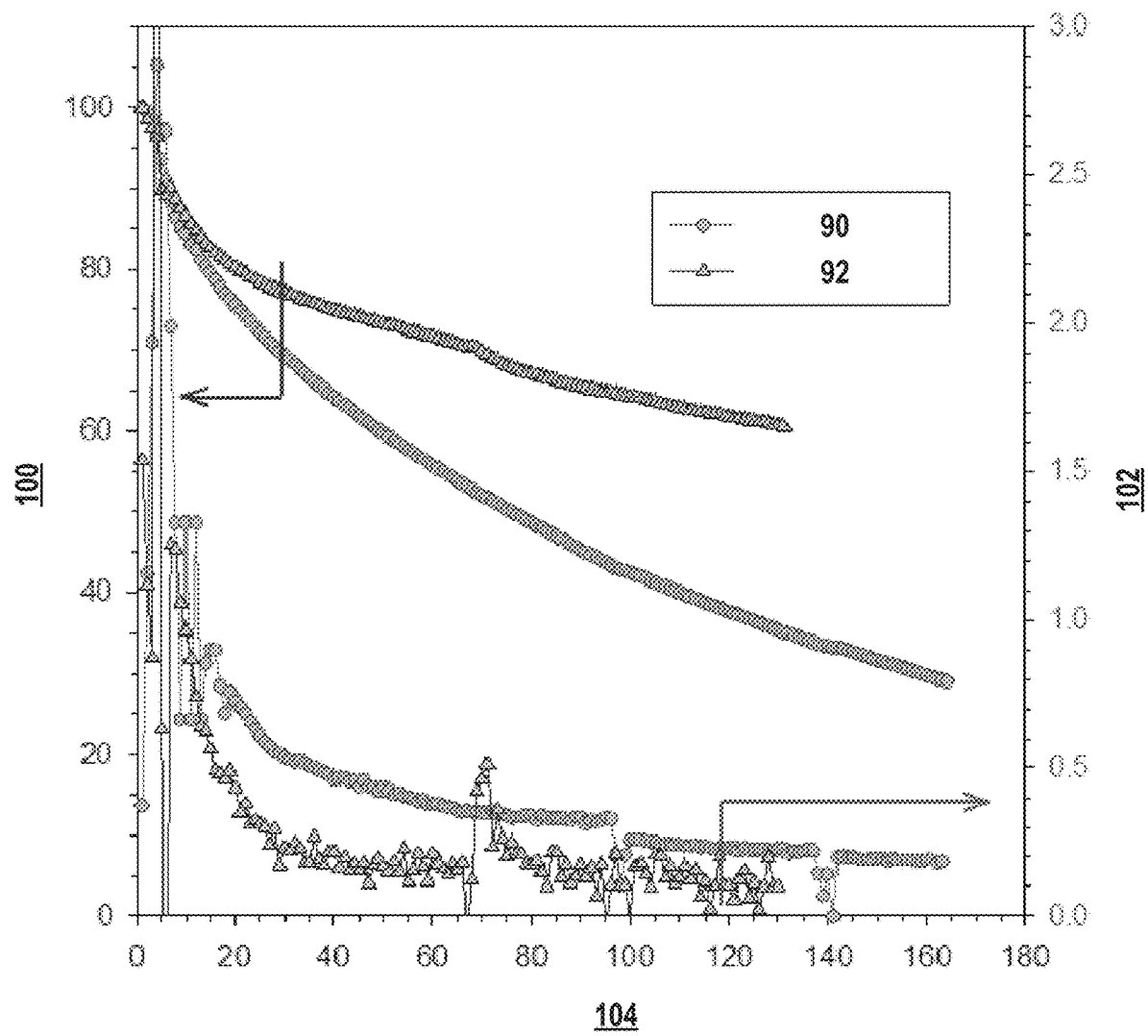

FIG. 5 shows normalized discharging capacity and capacity loss rate in LMO∥graphite cells comparing the performance obtained with a comparative baseline separator and with an example of an acid-scavenging separator including a polymer functionalized with a nitrogen-containing acid trapping group prepared according to certain aspects of the present disclosure during a 4 week cycling test at 0.2 C rate and 55° C. temperature.

Figure 6:
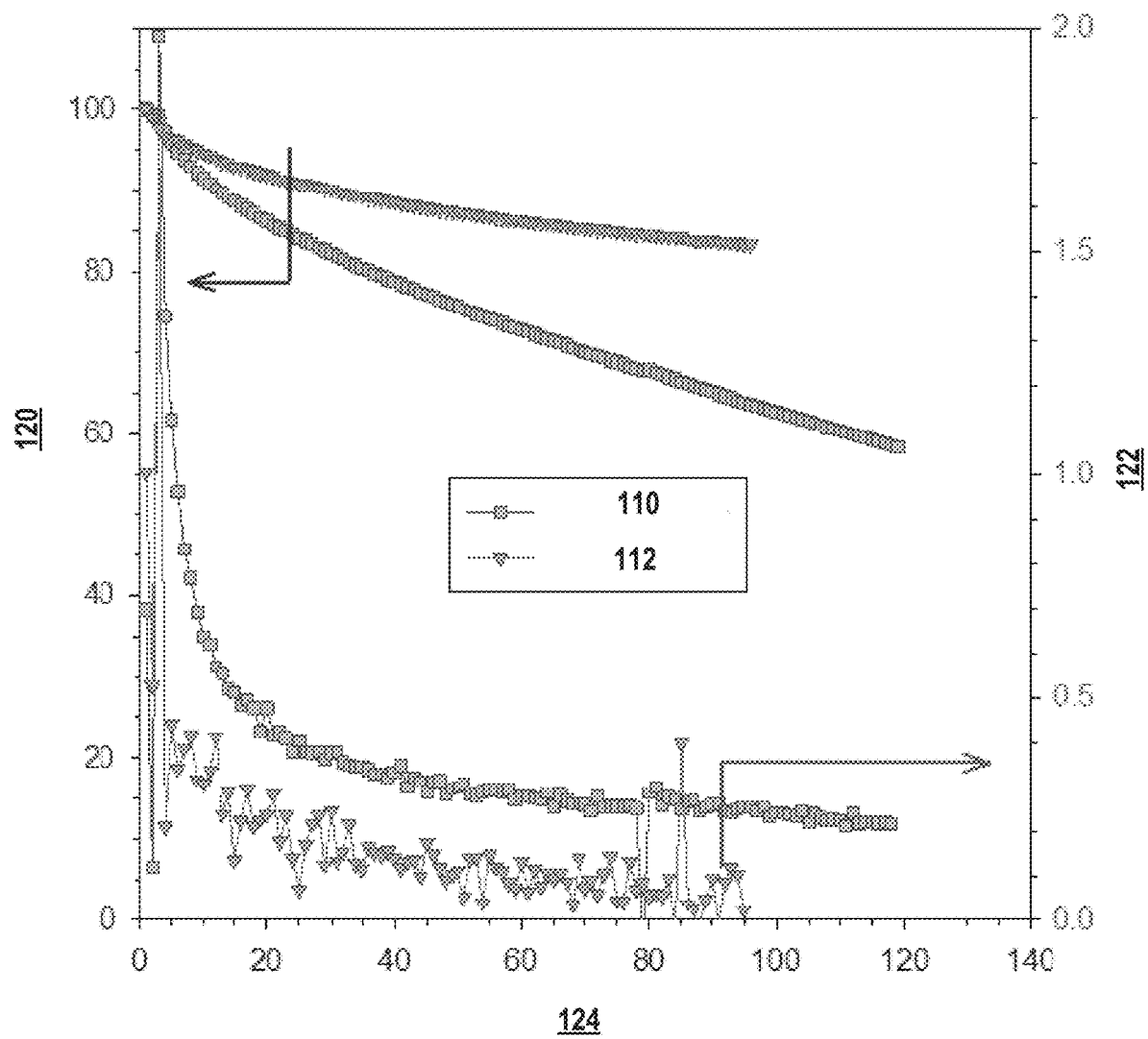

FIG. 6 shows normalized discharging capacity and capacity loss rate in NCM-6221∥graphite cells comparing the performance obtained with a comparative baseline separator and with an example of an acid-scavenging separator including a polymer functionalized with a nitrogen-containing acid trapping group prepared according to certain aspects of the present disclosure during a 4 week cycling test at 0.2 C rate and 55° C. temperature.

Figure 7:
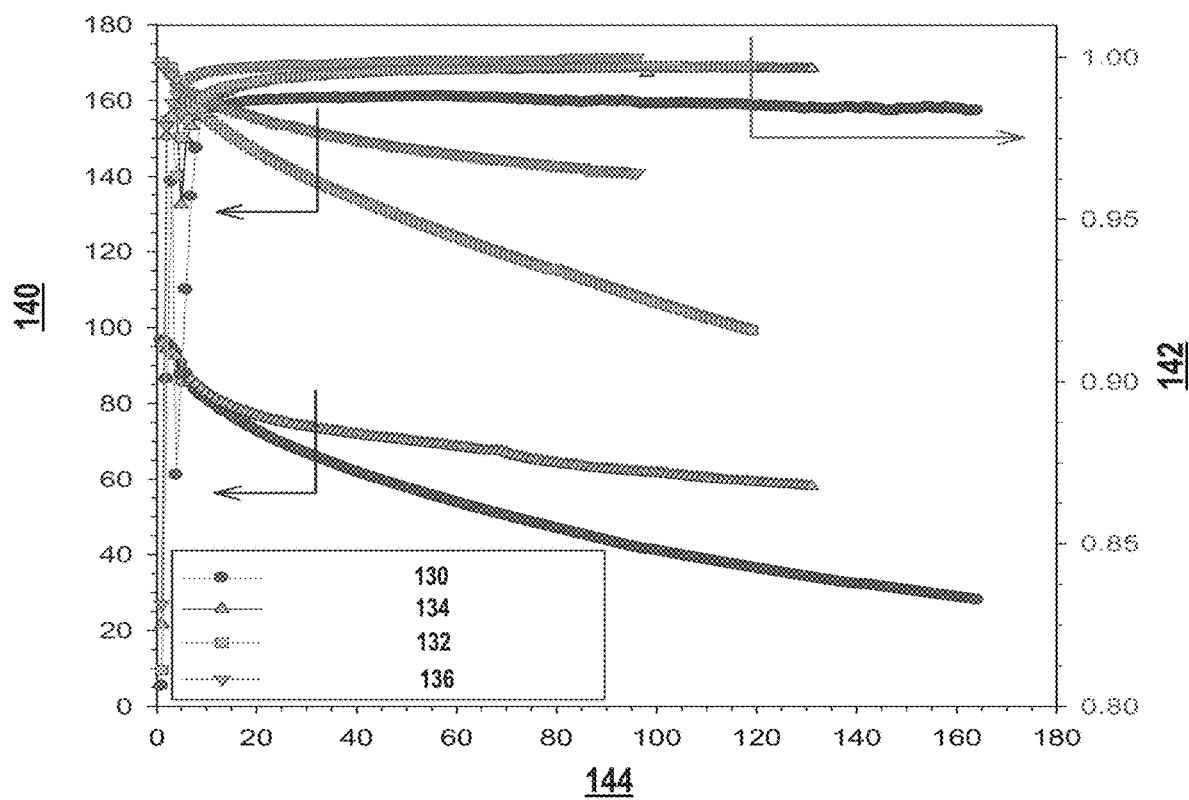

FIG. 7 shows cycling data including specific discharge capacity and Faradaic efficiency for LMO/graphite and NMC/graphite cells incorporating either a comparative baseline separator or an example of an acid-scavenging separator including a polymer functionalized with a nitrogen-containing acid trapping group prepared according to certain aspects of the present disclosure at 55° C.

FIGS. 8A-8D show cycling data including specific discharge capacity and Faradaic efficiency for LMO/graphite cells incorporating either a comparative baseline separator and an example of an acid-scavenging separator including a nitrogen-containing acid trapping group prepared according to certain aspects of the present disclosure at (FIG. 8A) 30° C., (FIG. 8B) 55° C. and NMC-622/graphite cells incorporating either a comparative baseline separator and an example of an acid-scavenging separator including a nitrogen-containing acid trapping group prepared according to certain aspects of the present disclosure at (FIG. 8C) 30° C., (FIG. 8D) 55° C.

FIGS. 9A-9D show electrochemical AC impedance data for LMO-Li cells with (FIG. 9A) an acid-scavenging functionalized separator prepared according to certain aspects of the present disclosure including poly-4-vinylpyridine (poly-4VP) compared to (FIG. 9B) a conventional CELGARD™ 2500 separator along with NMC-622-Li cells with (FIG. 9C) an acid-scavenging functionalized separator prepared according to certain aspects of the present disclosure including poly-4-vinylpyridine (poly-4VP) compared to (FIG. 9D) a conventional CELGARD™ 2500 separator.

Figures 10A, 10B:
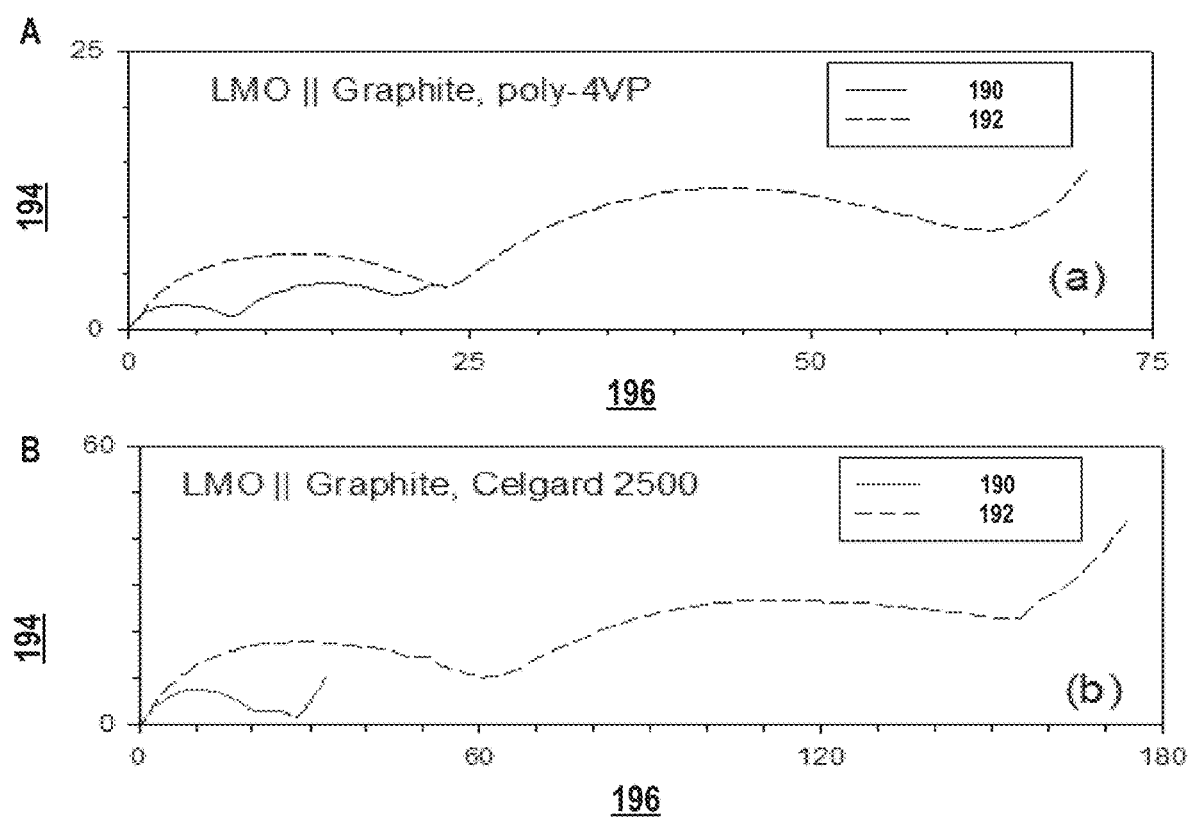
Figures 10C, 10D:
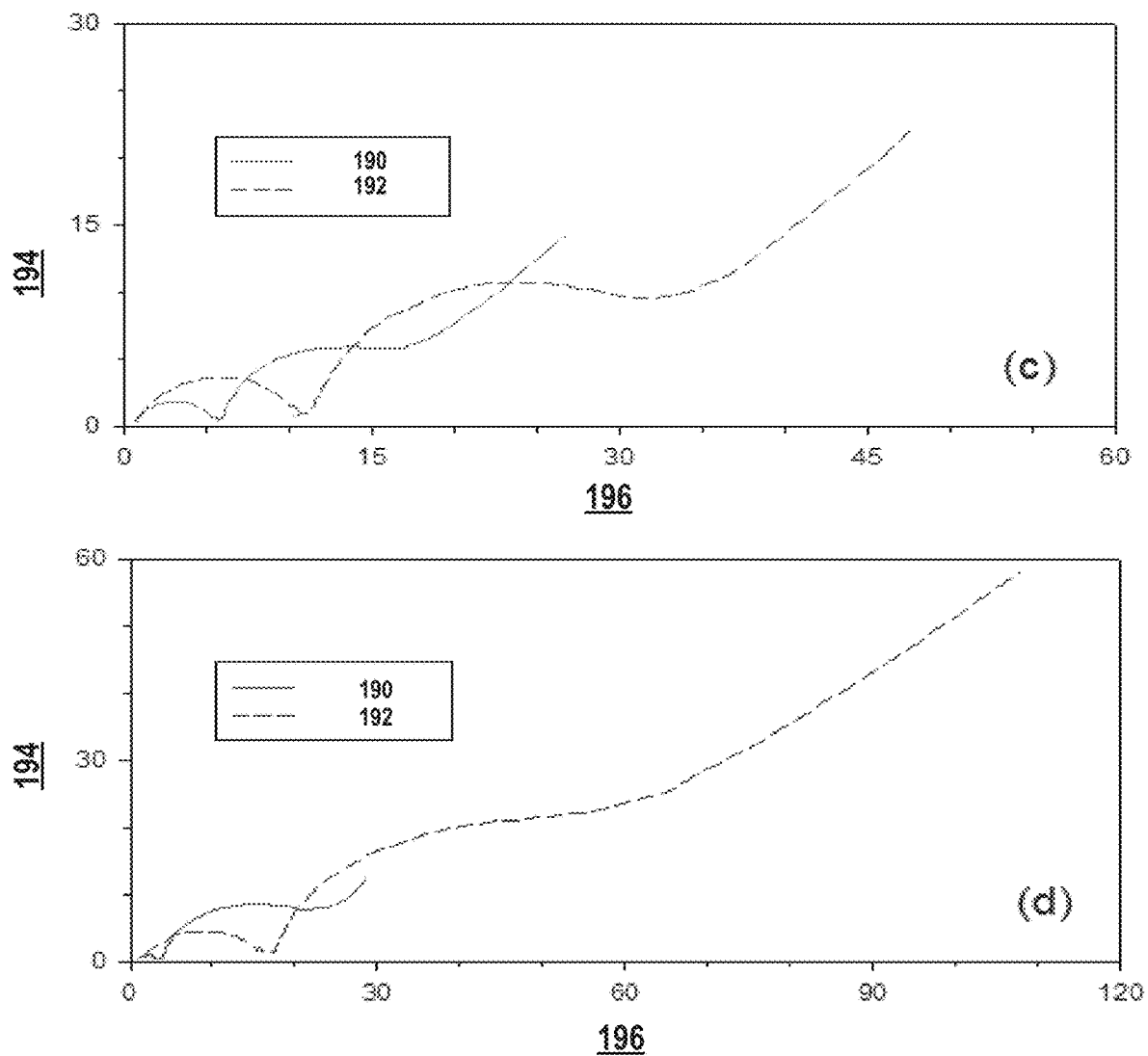

FIGS. 10A-10D show electrochemical AC impedance data. FIGS. 10A-10B show data for LMO-graphite cells with an acid-scavenging functionalized separator prepared according to certain aspects of the present disclosure compared to a conventional separator at formation and end of test, while FIGS. 10C-10D show impedance data for NMC622-graphite cells with an acid-scavenging functionalized separator prepared according to certain aspects of the present disclosure compared to a conventional separator at formation and end of test.

Figure 11:
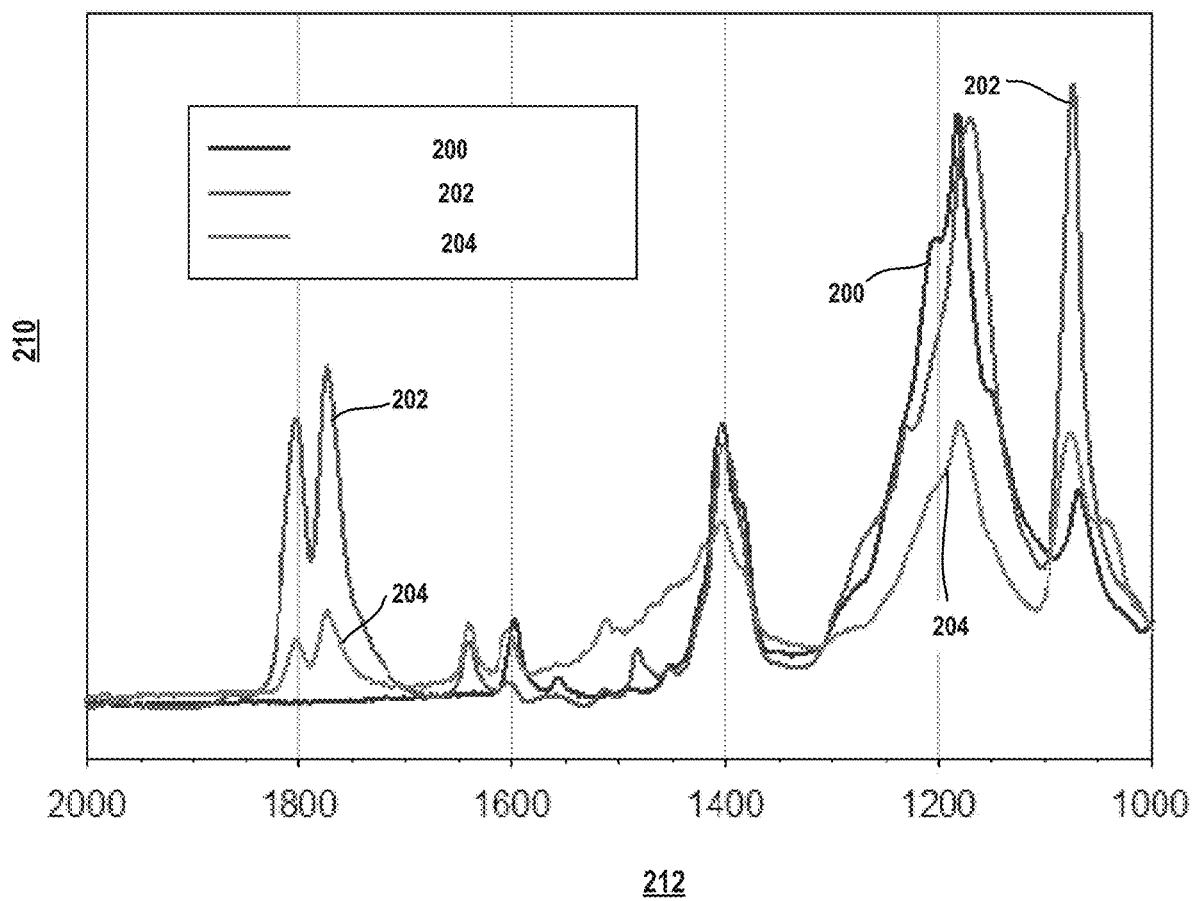

FIG. 11 displays the FTIR spectra of an acid scavenging functional separator prepared in accordance with certain aspects of the present disclosure in its pristine state and after cycling in an LMO∥graphite or NCM-622∥graphite cell.

Figure 12:
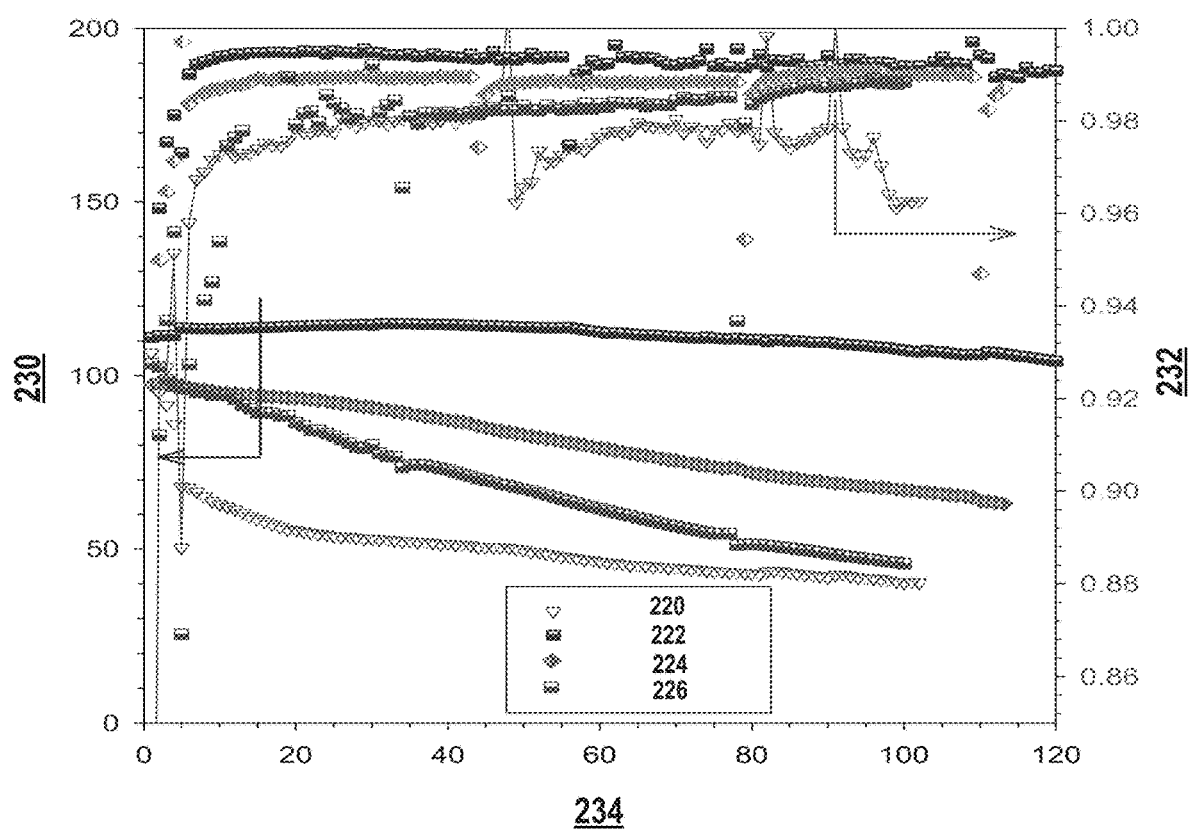

FIG. 12 shows comparative cycling data including specific discharging capacity and Faradaic efficiency for LNMO-graphite cells with a conventional separator, and an acid-scavenging separator prepared according to certain aspects of the present disclosure, as well as two multifunctional separators containing a styrene-divinylbenzene copolymer functionalized with disodium salt of iminodiacetic acid (poly-IDANa$_2$) and of a tetrasodium salt of ethylenediaminetetraacetic acid (i.e., tetrasodium edetate (Na$_4$EDTA)).

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

The disclosure of all patents, patent applications, articles, and literature referenced or cited in this disclosure are hereby incorporated by reference herein.

Example embodiments will now be described more fully with reference to the accompanying drawings.

Figure 1:
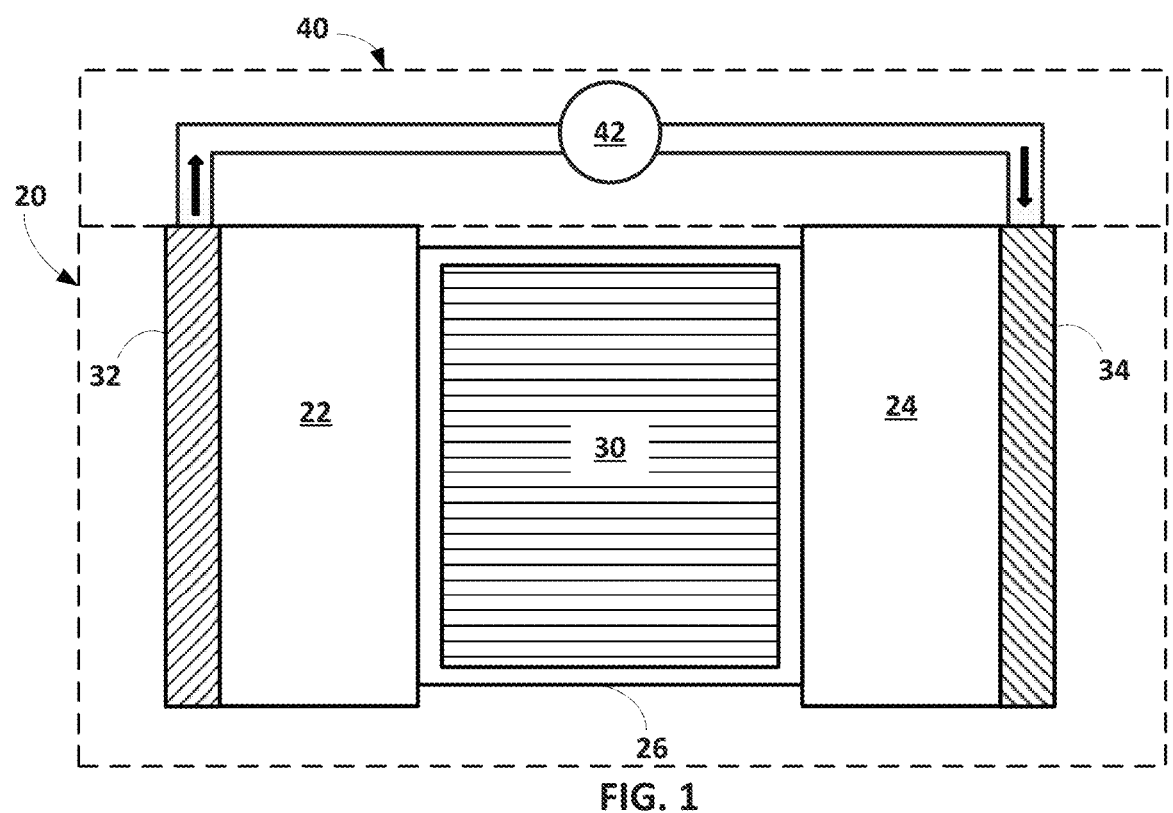
FIG. 1 is a schematic of an exemplary electrochemical battery cell.

The present technology pertains to improved electrochemical cells, especially lithium-ion batteries, which may be used in vehicle applications. However, the present technology may also be used in other electrochemical devices, especially those that include lithium ions. An exemplary and schematic illustration of a lithium-ion battery 20 is shown in FIG. 1. Lithium-ion battery 20 includes a negative electrode 22, a positive electrode 24, and a porous separator 26 (e.g., a microporous or nanoporous polymeric separator) disposed between the two electrodes 22, 24. The porous separator 26 includes an electrolyte 30, which may also be present in the negative electrode 22 and positive electrode 24. A negative electrode current collector 32 may be positioned at or near the negative electrode 22 and a positive electrode current collector 34 may be positioned at or near the positive electrode 24. The negative electrode current collector 32 and positive electrode current collector 34 respectively collect and move free electrons to and from an external circuit 40. An interruptible external circuit 40 and load 42 connects the negative electrode 22 (through its current collector 32) and the positive electrode 24 (through its current collector 34).

The porous separator 26 operates as both an electrical insulator and a mechanical support, by being sandwiched between the negative electrode 22 and the positive electrode 24 to prevent physical contact and thus, the occurrence of a short circuit. The porous separator 26, in addition to providing a physical barrier between the two electrodes 22, 24, can provide a minimal resistance path for internal passage of lithium ions (and related anions) during cycling of the lithium ions to facilitate functioning of the lithium-ion battery 20.

The lithium-ion battery 20 can generate an electric current during discharge by way of reversible electrochemical reactions that occur when the external circuit 40 is closed (to connect the negative electrode 22 and the positive electrode 34) when the negative electrode 22 contains a relatively greater quantity of lithium. The chemical potential difference between the positive electrode 24 and the negative electrode 22 drives electrons produced by the oxidation of intercalated lithium at the negative electrode 22 through the external circuit 40 toward the positive electrode 24. Lithium ions, which are also produced at the negative electrode, are concurrently transferred through the electrolyte 30 and porous separator 26 towards the positive electrode 24. The electrons flow through the external circuit 40 and the lithium ions migrate across the porous separator 26 in the electrolyte 30 to form intercalated or alloyed lithium at the positive electrode 24. The electric current passing through the external circuit 18 can be harnessed and directed through the load device 42 until the intercalated lithium in the negative electrode 22 is depleted and the capacity of the lithium-ion battery 20 is diminished.

The lithium-ion battery 20 can be charged or re-energized at any time by connecting an external power source to the lithium-ion battery 20 to reverse the electrochemical reactions that occur during battery discharge. The connection of an external power source to the lithium-ion battery 20 compels the otherwise non-spontaneous oxidation of intercalated lithium at the positive electrode 24 to produce electrons and lithium ions. The electrons, which flow back towards the negative electrode 22 through the external circuit 40, and the lithium ions, which are carried by the electrolyte 30 across the separator 26 back towards the negative electrode 22, reunite at the negative electrode 22 and replenish it with lithium for consumption during the next battery discharge cycle. As such, each discharge and charge event is considered to be a cycle, where lithium ions are cycled between the positive electrode 24 and negative electrode 22.

The external power source that may be used to charge the lithium-ion battery 20 may vary depending on the size, construction, and particular end-use of the lithium-ion battery 20. Some notable and exemplary external power sources include, but are not limited to, an AC wall outlet and a motor vehicle alternator. In many lithium-ion battery configurations, each of the negative current collector 32, negative electrode 22, the separator 26, positive electrode 24, and positive current collector 34 are prepared as relatively thin layers (for example, from several microns to a millimeter or less in thickness) and assembled in layers connected in electrical parallel arrangement to provide a suitable electrical energy and power package.

Furthermore, the lithium-ion battery 20 can include a variety of other components that while not depicted here are nonetheless known to those of skill in the art. For instance, the lithium-ion battery 20 may include a casing, gaskets, terminal caps, tabs, battery terminals, and any other conventional components or materials that may be situated within the battery 20, including between or around the negative electrode 22, the positive electrode 24, and/or the separator 26, by way of non-limiting example. As noted above, the size and shape of the lithium-ion battery 20 may vary depending on the particular application for which it is designed. Battery-powered vehicles and hand-held consumer electronic devices, for example, are two examples where the lithium-ion battery 20 would most likely be designed to different size, capacity, and power-output specifications. The lithium-ion battery 20 may also be connected in series or parallel with other similar lithium-ion cells or batteries to produce a greater voltage output, energy, and power if it is required by the load device 42.

Accordingly, the lithium-ion battery 20 can generate electric current to a load device 42 that can be operatively connected to the external circuit 40. While the load device 42 may be any number of known electrically-powered devices, a few specific examples of power-consuming load devices include an electric motor for a hybrid vehicle or an all-electric vehicle, a laptop computer, a tablet computer, a cellular phone, and cordless power tools or appliances, by way of non-limiting example. The load device 42 may also be a power-generating apparatus that charges the lithium-ion battery 20 for purposes of storing energy. In certain other variations, the electrochemical cell may be a supercapacitor, such as a lithium-ion based supercapacitor.

With renewed reference to FIG. 1, any appropriate electrolyte 30, whether in solid form or solution, capable of conducting lithium ions between the negative electrode 22 and the positive electrode 24 may be used in the lithium-ion battery 20. In certain aspects, the electrolyte solution may be a non-aqueous liquid electrolyte solution that includes a lithium salt dissolved in an organic solvent or a mixture of organic solvents. Numerous conventional non-aqueous liquid electrolyte 30 solutions may be employed in the lithium-ion battery 20. A non-limiting list of lithium salts that may be dissolved in an organic solvent to form the non-aqueous liquid electrolyte solution include $LiPF_6$, $LiClO_4$, $LiAlCl_4$, $LiI$, $LiBr$, $LiSCN$, $LiBF_4$, $LiB(C_6H_5)_4$, $LiB(C_2O_4)_2$, $LiBF_2(C_2O_4)$, $LiAsF_6$, $LiCF_3SO_3$, $LiN(CF_3SO_2)_2$, $LiN(FSO_2)_2$, and combinations thereof. As discussed below, the present technology is particularly suitable for use with an electrolyte that includes $LiPF_6$ salt. These and other similar lithium salts may be dissolved in a variety of organic solvents, including but not limited to various alkyl carbonates, such as cyclic carbonates (ethylene carbonate (EC), propylene carbonate (PC), butylene carbonate(BC)), linear carbonates (dimethyl carbonate (DMC), diethyl carbonate (DEC), ethylmethylcarbonate (EMC)), aliphatic carboxylic esters (methyl formate, methyl acetate, methyl propionate), γ-lactones (γ-butyrolactone, γ-valerolactone), chain structure ethers (1,2-dimethoxyethane, 1-2-diethoxyethane, ethoxymethoxyethane), cyclic ethers (tetrahydrofuran, 2-methyltetrahydrofuran), and combinations thereof.

The porous separator 26 may include, in one embodiment, a microporous polymeric separator including a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of PE and PP, or multi-layered structured porous films of PE and/or PP. Commercially available polyolefin porous membranes 26 include CELGARD® 2500 (a monolayer polypropylene separator) and CELGARD® 2320 (a trilayer polypropylene/polyethylene/polypropylene separator) available from Celgard LLC.

When the porous separator 26 is a microporous polymeric separator, it may be a single layer or a multi-layer laminate, which may be fabricated from either a dry or wet process. For example, in one embodiment, a single layer of the polyolefin may form the entire microporous polymer separator 26. In other aspects, the separator 26 may be a fibrous membrane having an abundance of pores extending between the opposing surfaces and may have a thickness of less than a millimeter, for example. As another example, however, multiple discrete layers of similar or dissimilar polyolefins may be assembled to form the microporous polymer separator 26.

The microporous polymer separator 26 may also include other polymers alternatively or in addition to the polyolefin such as, but not limited to, polyethylene terephthalate (PET), polyvinylidene fluoride (PVDF), polyamide (nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, polymethylpentene, polyolefin copolymers, acrylonitrile-butadiene styrene copolymers (ABS), polystyrene copolymers, polymethylmethacrylate (PMMA), polysiloxane polymers (such as polydimethylsiloxane (PDMS)), polybenzimidazole (PBI), polybenzoxazole (PBO), polyphenylenes, polyarylene ether ketones, polyperfluorocyclobutanes, polyvinylidene fluoride copolymers (e.g., PVdF-hexafluoropropylene or (PVdF-HFP)), and polyvinylidene fluoride terpolymers, polyvinylfluoride, liquid crystalline polymers (e.g., VECTRAN™ (Hoechst AG, Germany) and ZENITE® (DuPont, Wilmington, Del.)), polyaramides, polyphenylene oxide, cellulosic materials, meso-porous silica, and/or combinations thereof.

The polyolefin layer, and any other optional polymer layers, may further be included in the microporous polymer separator 26 as a fibrous layer to help provide the microporous polymer separator 26 with appropriate structural and porosity characteristics. Thus, the nanoporous or microporous membrane separator 26 may contain a single layer or a multi-layer laminate fabricated from either a dry or wet process, by solvent casting, by a non-woven fiber laying process, or by any other process for making a nanoporous or microporous membrane separator 26 with properties suitable for application in Li-ion batteries. For example, in one example, a single layer of the polyolefin may constitute the entirety of the separator membrane separator 26. In another example, a single layer of one or a combination of any of the polymers from which the separator 26 may be formed (e.g., the polyolefin and/or one or more of the other polymers listed above for the separator 26) may constitute the entirety of the separator 26. As another example, however, multiple discrete layers of similar or dissimilar polyolefins and/or polymers for the separator 26 may be assembled into the separator 26. In one example, a discrete layer of one or more of the polymers may be coated on a discrete layer of the polyolefin for the separator 26. Further, the polyolefin (and/or other polymer) layer, and any other optional polymer layers, may further be included in the separator 26 as a fibrous layer to help provide the separator 26 with appropriate structural and porosity characteristics. A more complete discussion of single and multi-layer lithium ion battery separators, and the dry and wet processes that may be used to make them, can be found in P. Arora and Z. Zhang, "Battery Separators," *Chem. Rev.*, 104, 4424-4427 (2004).

Furthermore, the porous separator 26 may be mixed with a ceramic material or its surface may be coated in a ceramic material. For example, a ceramic coating may include alumina ($Al_2O_3$), silicon dioxide ($SiO_2$), or combinations thereof. Various conventionally available polymers and commercial products for forming the separator 26 are contemplated, as well as the many manufacturing methods that may be employed to produce such a microporous polymer separator 26.

In various aspects, the negative electrode 22 includes an electroactive material as a lithium host material capable of functioning as a negative terminal of a lithium-ion battery. The negative electrode 22 may thus include the electroactive lithium host material and optionally another electrically conductive material, as well as one or more polymeric binder materials to structurally hold the lithium host material together. For example, in one embodiment, the negative electrode 22 may include an active material including graphite, silicon, tin, or other negative electrode particles intermingled with a binder material selected from the group consisting of: polyvinylidene difluoride (PVDF), ethylene propylene diene monomer (EPDM) rubber, or carboxymethoxyl cellulose (CMC), a nitrile butadiene rubber (NBR), lithium polyacrylate (LiPAA), sodium polyacrylate (NaPAA), sodium alginate, lithium alginate, and combinations thereof, by way of non-limiting example. Suitable additional electrically conductive materials may include carbon-based material or a conductive polymer. Carbon-based materials may include by way of non-limiting example, particles of KETCHEN™ black, DENKA™ black, acetylene black, carbon black, and the like. Examples of a conductive polymer include polyaniline, polythiophene, polyacetylene, polypyrrole, and the like. In certain aspects, mixtures of conductive materials may be used.

Graphite is often used to form the negative electrode 22 because it exhibits advantageous lithium intercalation and deintercalation characteristics, is relatively non-reactive in the electrochemical cell environment, and can store lithium in quantities that provide a relatively high energy density. Commercial forms of graphite and other graphene materials that may be used to fabricate the negative electrode 22 are available from, by way of non-limiting example, Timcal Graphite and Carbon of Bodio, Switzerland, Lonza Group of Basel, Switzerland, or Superior Graphite of Chicago, United States of America. Other materials can also be used to form the negative electrode 22, including, for example, lithium-silicon and silicon containing binary and ternary alloys and/or tin-containing alloys, such as Si—Sn, SiSnFe, SiSnAl, SiFeCo, $SnO_2$, and the like. In certain alternative embodiments, lithium-titanium anode materials are contemplated, such as $Li_{4+x}Ti_5O_{12}$, where $0 \leq x \leq 3$, including lithium titanate ($Li_4Ti_5O_{12}$) (LTO).

The present technology is particularly suitable for use with negative electrode materials for the negative electrode 22 that include graphite materials. Such graphite materials may of course be combined with other electroactive materials. The principles of the present teachings may likewise be advantageous for use with other negative electrode materials, such as those containing silicon or tin, in certain alternative variations. The negative electrode current collector 32 may be formed from copper or any other appropriate electrically conductive material known to those of skill in the art.

The positive electrode 24 may be formed from a lithium-based active material that can sufficiently undergo lithium intercalation and deintercalation or alloying and dealloying, while functioning as the positive terminal of the lithium-ion battery 20. The positive electrode 24 may include a polymeric binder material to structurally fortify the lithium-based active material. The positive electrode 24 electroactive materials may include one or more transition metals, such as manganese (Mn), nickel (Ni), cobalt (Co), chromium (Cr), iron (Fe), vanadium (V), and combinations thereof. In certain aspects, the positive electrode 24 may include an electroactive material that includes manganese (Mn). Two exemplary common classes of known electroactive materials that can be used to form the positive electrode 24 are lithium transition metal oxides with layered structure and lithium transition metal oxides with spinel phase. For example, in certain embodiments, the positive electrode 24 may include a spinel-type transition metal oxide, like lithium manganese oxide ($Li_{(1+x)}Mn_{(2-x)}O_4$), where x is typically less than 0.15, including $LiMn_2O_4$ (LMO) and lithium manganese nickel oxide $LiMn_{1.5}Ni_{0.5}O_4$ (LMNO). In other embodiments, the positive electrode 24 may include layered materials like lithium cobalt oxide ($LiCoO_2$), lithium nickel oxide ($LiNiO_2$), a lithium nickel manganese cobalt oxide ($Li(Ni_xMn_yCo_z)O_2$), where $0 \leq x \leq 1$, $0 \leq y \leq 1$, $0 \leq z \leq 1$, and $x+y+z=1$, including $LiMn_{0.33}Ni_{0.33}Co_{0.33}O_2$, a lithium nickel cobalt metal oxide ($LiNi_{(1-x-y)}Co_xM_yO_2$), where $0<x<1$, $0<y<1$ and M may be Al, Mn, or the like. Other known lithium-transition metal compounds such as lithium iron phosphate (LiFePO$_4$) or lithium iron fluorophosphate (Li$_2$FePO$_4$F) can also be used. In certain aspects, the positive electrode 24 may include an electroactive material that includes manganese, such lithium manganese oxide (Li$_{(1+x)}$Mn$_{(2-x)}$O$_4$), a mixed lithium manganese nickel oxide (LiMn$_{(2-x)}$Ni$_x$O$_4$), where $0 \leq x \leq 1$, and/or a lithium manganese nickel cobalt oxide (e.g., LiMn$_{1/3}$Ni$_{1/3}$Co$_{1/3}$O$_2$).

Such active materials may be intermingled with an optional electrically conductive material and at least one polymeric binder, for example, by slurry casting active materials with such binders, like polyvinylidene difluoride (PVDF), ethylene propylene diene monomer (EPDM) rubber, or carboxymethoxyl cellulose (CMC), a nitrile butadiene rubber (NBR), lithium polyacrylate (LiPAA), sodium polyacrylate (NaPAA), sodium alginate, lithium alginate. Electrically conductive materials may include graphite, carbon-based materials, or a conductive polymer. Carbon-based materials may include by way of non-limiting example particles of KETCHEN™ black, DENKA™ black, acetylene black, carbon black, and the like. Examples of a conductive polymer include polyaniline, polythiophene, polyacetylene, polypyrrole, and the like. In certain aspects, mixtures of conductive materials may be used. The positive current collector 34 may be formed from aluminum or any other appropriate electrically conductive material known to those of skill in the art.

Lithium transition metal based oxides, especially lithium manganese-based oxides, have been explored for use as positive electrode active materials because of their lower costs, high rate capability, and higher thermal stability, as compared with traditional Co or Ni rich cathode active materials. LNMO and Li-rich oxygen-deficient NMC are promising candidates for electrochemical propulsion, due to their high voltage, hence high power, and specific energy, in addition to other important benefits such as environmental friendliness and lower cost. However, these manganese-rich oxide based materials suffer from certain shortcomings, such as capacity fade, which may be attributable to transition metal dissolution from the positive electrode and deposition at the negative electrode.

When transition metals ions, like Mn$^{x+}$ (x=2,3) are deposited on the negative electrode, they catalyze electrolyte degradation reactions which consume electroactive Li$^+$ ions and cause malignant growth of the solid electrolyte interface (SEI) layer, thus impeding lithium ion intercalation into the negative electrode. Further, the degradation of the positive electrode electroactive material potentially results in material loss and capacity fading. More specifically, it has been found that lithium ion batteries are deleteriously affected by the dissolution of transition metal cations from the positive electrode, which results in accelerated capacity fading, and thus loss of durability in the battery. The transition metal cations migrate from the positive electrode to the negative electrode of the battery, leading to its "poisoning." Thus, in accordance with certain aspects of the present disclosure, it is believed that a main mechanism for the capacity fading in manganese-containing materials can be attributed to manganese being deposited on negative electrodes that include graphite or other negative electrode materials, which further catalyzes and thus enhances additional electrolyte decomposition reactions.

In one example, a graphite electrode may be poisoned by Mn$^{+2}$, Mn$^{+3}$ or Mn$^{+4}$ cations that dissolve from a spinel Li$_x$Mn$_2$O$_4$ active material of the positive electrode. For instance, the Mn$^{+2}$ cations may migrate through the battery electrolyte, and deposit onto a negative electrode (e.g., a graphite electrode). It has been shown that a relatively small amount (e.g., 90 ppm) of Mn metal can poison the graphite electrode, which leads to loss of electroactive Li$^+$ ions and excessive SEI growth and which impedes the reversible cell operation, thereby deleteriously affecting the useful life of the battery. The deleterious effect of the Mn deposited at the negative electrode is significantly enhanced during battery exposure to above-ambient temperatures (e.g., above 40° C.), irrespective of whether the exposure occurs through mere storage (i.e., simple stand at open circuit voltage in some state of charge) or during battery operation (i.e., during charging, during discharging, or during charging-discharging cycling).

Another potential complication involves the presence of lithium hexafluorophosphate (LiPF$_6$) salt, which is mixed in alkyl carbonate solvent solutions in most commercial lithium ion battery electrolytes. LiPF$_6$ salt provides a good combination of desirable properties, including good ionic conductivity over a wide temperature range, wide voltage stability window, and passivation of aluminum current collectors. However, LiPF$_6$ salts are neither electrochemically stable while in contact with the active materials in the electrodes, nor chemically stable in mixed alkyl carbonate solvents at elevated temperatures or at high cell voltages. The LiPF$_6$ salt undergoes autocatalytic decomposition (LiPF$_6 \rightarrow$LiF+PF$_5$). Electrolyte including LiPF$_6$ initially contains trace HF from the manufacturing process prior to any cycling in a battery, its anion (PF$^{6-}$) decomposes thermally above 50° C. and generates HF, and it generates HF in contact with water (present in trace amounts at battery assembly or generated during solvent composition reactions). Thus, in the presence of trace amount of water in carbonate solvents, both LiF and LiF$_5$ generate HF (PF$_5$+H$_2$O$\rightarrow$2HF+PF$_3$O). The acids generated by the electrolyte, namely hydrofluoric acid and Lewis acids (PF$_5$, PF$_3$O, etc.), can then promote other parasitic reactions in a lithium-ion battery, among which transition metal (TM) ions dissolution from positive electrode active materials and reactions involving the loss of Li$^+$ cations are particularly problematic.

Among TM ions, the Mn$^{x+}$ ions' dissolution and its deleterious consequences are especially pronounced for materials with Mn$^{3+}$ cations and spinel phases, such as LiMn$_2$O$_4$ (LMO), LiMn$_{1.5}$Ni$_{0.5}$O$_4$ (LNMO), and Li-rich oxygen-deficient mixed Ni—Mn—Co oxides (NMC).

Furthermore, the consequences of manganese dissolution are substantial in comparison to the degradation effects initiated by the dissolution of other TM ions (Ni and Co). Moreover, the extent of Mn dissolution from the spinel phase is much greater than from other phases, such as layered structures. Nevertheless, whatever their identity and source, dissolved TM ions migrate towards negative electrodes and poison the solid-electrolyte interface (SEI) formed thereon. The contaminated SEI then loses its passivating properties. Thereafter malignant SEI growth and consequently premature capacity loss is unavoidable. The loss of electroactive Li$^+$ ions decreases the available energy in the cell and promotes the growth of thicker and ionically resistive surface films on electrode surfaces, which both impair the power performance of the cell and lead to an under-utilization of cell capacity due to an increased cell resistance.

Various ways to minimize Mn ion dissolution and its consequences have been explored, such as cationic and anionic substitutions into the active material lattice, surface coatings, and the use of various additives. However, no single mitigation measure appears to be fully successful by itself and only a combination of prevention measures appears likely to yield desired performance improvements.

A different mitigation route involves employing multifunctional materials in the inter-electrode space as a separator material. In electrochemical cells using these multifunctional materials, the SEI appears to remain in its desired functional state (e.g., ionically conducting and electronically insulating) and maintains the passivation of the electrode without malignant growth throughout the cell life, leading to excellent capacity retention even at elevated temperatures. Although these separators are trifunctional (e.g., TM ion trapping, acid species scavenging, and alkali metal ion dispensing), their primary function is that of trapping transition metal (particularly Mn) cations subsequent to their dissolution from positive electrodes, with the other two functions playing an ancillary role. Furthermore, their acid scavenging function is based on an ion-exchange mechanism, which appears to not be very efficient at low acid concentrations, for example, at acid concentrations of less than or equal to about 10 parts per million (ppm) of acid. Prior to any cycling, an initial electrolyte may contain acid at such low levels. Where the acid is present in a lithium electrochemical cell (e.g., at the beginning of a cell's life during the crucial protective electrode film formation process), even at such low concentrations and prior to any cycling or operation, the TM dissolution and degradation process can occur.

Some of the multifunctional separators used in previous work scavenged protons though an ion-exchange mechanism, which is not very effective at low acid concentrations, i.e., at the beginning of a cell's life, during the crucial protective electrode film formation process It appears that the interaction of HF and other acid species with positive electrode materials represents the major factor driving the TM ions' undesirable dissolution in Li-ion batteries with LiPF$_6$ electrolyte in mixed alkyl carbonate solvents. The present technology provides an acid scavenging polymer, which may be incorporated into a separator, whose sole function is believed to be the scavenging of acid species, which can occur even at low acid concentrations of less than or equal to about 10 ppm, so that a root cause of many lithium-ion battery performance degradation processes can be minimized or suppressed. In this manner, the durability and performance of Li-ion batteries can be improved by eliminating or minimizing two main degradation modes: (1) the DMDCS (=Dissolution-Migration-Deposition-Catalytic Reactions) degradation loop, initiated by the dissolution transition metal (TM) ions though acid attack on the active materials in the positive electrodes; (2) the loss of Li$^+$ ions in reactions with acid electrolyte species, that are not directly related to TM ions dissolution. By incorporating an acid scavenging polymer, formation of HF and other acid species can be suppressed early, rather than trying to prevent the TM ions from doing harm, once they have already dissolved into the electrolyte solution.

The acid scavenging polymer includes an acid trapping moiety including a nitrogen-containing group capable of participating in a Lewis acid-base neutralization reaction with the one or more acids present in the electrochemical cell. The nitrogen-containing group may be selected from the group consisting of an amine group, a pyridine group, and combinations thereof. The acid scavenging polymer may be a homopolymer including a nitrogen-containing group or may be a copolymer (having two or more monomers, one of which includes a nitrogen-containing group).

In certain variations, the nitrogen-containing acid-trapping moiety may be a polymer-bound group selected from the group consisting of: pyridine (including 2-vinylpyridine, 3-vinylpyridine, and 4-vinylpyridine), dimethylaminomethylstyrene, diethylaminomethylstyrene, vinylpyridine-4-acetamide, vinylphenanthroline, vinylphenylenediamine, 1,10-phenanthroline, vinyl-1,10-phenanthroline, 1,10-phenanthroline-5,6-dione, vinyl-1,10-phenanthroline-5,6-dione, (dimethylamino)pyridine, alkyleneamines, 7-azaindole-pyridine, vinyl(dimethylaminomethyl)pyridine, tolylpyridine, oxyalkyl-pyridine, vinyl(diethylaminomethyl)pyridine, 4-(dimethylamino)pyridine, 2-(3-aminophenyl)pyridine, 1,8-naphthyridine, poly(2,3,5,6-pyridine), poly(2,5-pyridine), poly(3,5-pyridine), poly(isopropenylpyridine), poly(4-(dimethylaminomethyl)vinylpyridine), poly[2-(3-aminophenyl)pyridine], poly(1,8-naphthyridine), poly(2,3,5,6-pyridine), poly(2,5-pyridine), poly(3,5-pyridine), dialkylamines, including poly(divinylbenzene-co-vinylbenzyldimethylamine) and poly(divinylbenzene-co-vinylbenzyldiethylamine), their isomers, combinations, and derivatives thereof. Some of these nitrogen-containing are pyridine and amine pendant groups, while others are main chain pyridine and amine groups.

Among the suitable nitrogen-containing functional groups that scavenge acids are polymer-bound amino groups including pyridines, for example, including polymers incorporating 2-vinylpyridine and 4-vinylpyridine, dialkylamino-substituted polymers, such as dimethylamino-substituted polymers, for example, formed from dimethylaminomethylstyrene, in turn derived from chloromethylstyrene monomers and polymers, and diethylamino-substituted polymers, including polymers from diethylaminomethylstyrene that is in turn derived from chloromethylstyrene monomers and polymers. In one particularly suitable variation, the nitrogen-containing acid-trapping moiety includes 4-vinylpyridine.

Pyridine is a Lewis base that can efficiently scavenge acidic species. The acid scavenging mechanism of pyridine is based on the Lewis base-acid interaction, which is more effective than ion exchange for scavenging trace amounts of acids. In one example, the nitrogen-containing acid-trapping moiety pendant group includes 4-vinylpyridine and can react with hydrofluoric acid (HF) in Lewis acid-base scavenging or neutralization reaction with the acid to form pyridinium hydrofluoride, as shown in the reaction below.

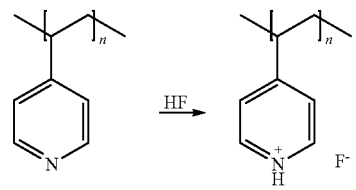

The polymer to which the nitrogen-containing group is bound may be a homopolymer or a copolymer (including two or more monomers, such as a terpolymer). The polymer may be selected from the group consisting of: vinyl polymers, such as with vinyl alcohol, divinylbenzene, styrene, alkylenes, such as propylene, ethylene, and the like, ethyleneimine, methyl methacrylate, t-butyl methacrylate, methacrylic acid, ε-caprolactone, dimethylsiloxane, n-butyl methacrylate, α-methyl styrene, acetylene, butadiene, isoprene, butylene, isobutylene, ethylene oxide, and propylene oxide, vinylidene fluoride, vinyl fluoride, and tetrafluoroethylene, as co-polymers, ter-polymers, derivatives, and combinations thereof.

The polymer may be formed from monomers selected from the group consisting of: vinyl or unsaturated monomers, such as vinyl alcohol, vinyl acetate, divinylbenzene, styrene, α-methyl styrene, isoprene, butadiene, polyalkylenes, such as propylene, ethylene, and the like, acetylene, ethylene, propylene, butylene, isobutylene, ethylene oxide, and propylene oxide, ethyleneimine, methyl methacrylate, t-butyl methacrylate, methacrylic acid, ε-caprolactone, dimethylsiloxane, n-butyl methacrylate, vinylidene fluoride, vinyl fluoride, and tetrafluoroethylene, co-polymers (including ter-polymers), derivatives, and combinations thereof. The polymer backbones may be homopolymers (formed from a single monomer) or copolymers (including two or more monomers). The polymer backbones may be cross-linked. The polymers may be used in separators or as binders in electrodes, by way of example.

In certain aspects, the polymer for a separator can be a homopolymer, for example, derived from the reaction of 2-vinylpyridine and/or 4-vinylpyridine, copolymers, for example, derived from chloromethylstyrene monomers or its polymers and its reactions with amines such as diethylamine and dimethylamine, random copolymers (including random terpolymers), block polymers, and the like of these with styrene (vinylbenzene), derived from 2-vinylpyridine, 4-vinylpyridine, and iso-propenylpyridine including copolymers with acrylates and methacrylates, such as methyl methacrylate, t-butyl methacrylate, methacrylic acid, n-butyl methacrylate, ε-caprolactone, dimethylsiloxane, styrene, α-methyl styrene, acetylene, butadiene, isoprene, ethylene, propylene, butylene, isobutylene, ethylene oxide, and propylene oxide. Ethylene, propylene, and butylene can be made by hydrogenation of segments derived from butadiene and isoprene segments.

Other polymers for use in separators may include nanoparticles made from 3-dimethylaminomethylvinylbenzene or 4-dimethylaminomethylvinylbenzene and/or 3-diethylaminomethylvinylbenzene or 4-diethylaminomethylvinylbenzene crosslinked with divinylbenzene. These particles can be made from protonated monomers: (3- or 4-dimethylammonium)vinylbenzyl chloride and/or (3- or 4-diethylammonium)vinylbenzyl chloride copolymerized in emulsion with divinylbenzene (as described in Y. Tang, et al., "Preparation of monodisperse core-shell microspheres with surface antibacterial property employing N-(4-vinylbenzyl)-N,N-diethylamine hydrochloride as surfmer," International Journal of Polymeric Materials and Polymeric Biomaterials, 2016, 65:3, 143-150); or alternatively, they can be made by emulsion polymerization of 3- or 4-vinylbenzyl chloride with divinylbenzene followed by reaction with dimethylamine or diethylamine. In certain variations, the polymer may be a cross-linked polymer.

In certain aspects, the nitrogen-containing acid-trapping moiety includes pyridine. For example, in certain aspects, the polymer includes divinylbenzene and the nitrogen-containing acid-trapping moiety includes vinylpyridine. In one variation, the polymer including a nitrogen-containing acid-trapping moiety includes from greater than or equal to about 40% to less than or equal to about 100% by mass 4-vinylpyridine and greater than or equal to 0% to less than or equal to about 40% cross-linked divinylbenzene. In one variation, the nitrogen-containing acid-trapping moiety has about 75% by mass 4-vinylpyridine and about 25% cross-linked divinylbenzene.

In certain variations, suitable copolymers of 4-vinylpyridine and divinylbenzene are commercially available from Vertellus (Indianapolis, Ind.) as REILLEX™ 402 (granular, 25% cross-linked); REILLEX™ 425 (macroporous); REILLEX™ HP (having a greater pore volume than REILLEX™ 425); and REILLEX™ HPQ (strong base, macro-porous). In certain aspects, REILLEX™ 402 can be used as the cross-linked polymer. In other variations, REILLEX™ 425 can be used as the cross-linked polymer, which has about 75% by mass 4-vinylpyridine and about 25% cross-linked divinylbenzene.

For some separator applications, nanoparticles made by emulsion polymerization may be used, and the nanoparticles are robust (e.g., maintain their spherical structure) if cross-linking provided by copolymerization with divinylbenzene exceeds 10 wt. % and optionally greater than or equal to 20 wt. %. Nanoparticles may have an average particle size diameter of less than or equal to about 1 micrometer (μm), optionally less than or equal to about 500 nm, optionally less than or equal to about 250 nm, and in certain aspects, optionally less than or equal to about 100 nm. Nanoparticles in this instance may be coated onto or impregnated into conventional battery separators including nano-porous and micro-porous polyethylene and/or polypropylene membranes, such as those manufactured by Celgard, Entek, Toray, and the like or impregnated into the ceramic coating of such separators. In other aspects, the polymer may be a liquid that is coated onto one or more surfaces and then dried and solidified (reacted, cross-linked, etc.).

In aspect, a commercial polyethylene and polypropylene separator can be coated by suspending nanoparticles of acid neutralizing polyamines (such as REILLEX™ 425 or 402) in methanol, ethanol, isopropanol or tetrahydrofuran to form a slurry, and then either dipping the separator in the slurry or applying a coating of the slurry to the separator, followed by oven-drying to remove the volatile liquid. The slurry have greater than or equal to about 1 wt. % to less than or equal to about 50 wt. % of the nanoparticle, optionally with greater than or equal to about 5 wt. % to less than or equal to about 10 wt. %. In another variation of forming a coating, a 10 wt. % to 40 wt. % acid-trapping polymer and suitable binder can be provided in a carrier solvent like water, methanol, ethanol, isopropanol, N-methyl pyrrolidone, and the like and can coat a pre-existing separator by means of dip-coating or slot-die coating process. The coating may include greater than or equal to about 90% to less than or equal to about 98% acid-trapping polymer and greater than or equal to about 2% to less than or equal to about 10% of a suitable binder. Binders can be polyvinyl alcohol, polyvinyl pyrrolidone, poly(ethylene-alt-dilithium maleate), poly (4-vinylpyridine), poly(2-vinylpyridine), poly(vinylbenzyl chloride), or any of the other binder polymers, including homopolymers, discussed further herein.

The nitrogen-containing acid trapping moiety may be a pendant group incorporated into a binder material. For acid scavenging polymers including a nitrogen-containing acid trapping moiety used in binder applications, the polymer should be soluble. Suitable polymers as binders include poly(4-vinylpyridine) is commercially available from Sigma Aldrich as Cat. No. 472344 at 60,000 Weight Average Molecular Weight ($M_w$) and 160,000 $M_w$ as Cat. No. 472352. Poly(2-vinylpyridine) is commercially available from Sigma Aldrich as Cat. No. having 5,000 $M_w$, Cat. No. 523291; having 35,000 $M_w$, Cat. No. 523321 having 78,500 $M_w$, Cat. No. 523348; and having 152,000 $M_w$, and Cat. No. 523356. Soluble polymers other than homopolymers can also be useful for binder applications. Other polymers (random, block, tri-bock, co- and ter-polymers, etc.) derived from 2-vinylpyridine and 4-vinylpyridine, including copolymers with methyl methacrylate, t-butyl methacrylate, methacrylic acid, ε-caprolactone, dimethylsiloxane, n-butyl methacrylate, styrene, α-methyl styrene, acetylene, butadiene, isoprene, ethylene, propylene, butylene, isobutylene, ethylene oxide, and propylene oxide are commercially available from Polymer Source, Inc. (Montreal, Canada). Polymers (random, block, triblock, etc.) derived from iso-propenylpyridine are also contemplated, including copolymers with ethylene oxide, t-butyl acrylate, and methyl methacrylate, that are also commercially available from Polymer Source, Inc. Homopolymers suitable for preparing dimethylamino- and diethylamino-substituted vinylbenzyl derivatized polymers can be made from poly(vinylbenzyl chloride). Vinylbenzyl chloride homopolymers are available from several sources. Poly(chloromethylstyrene) or poly (vinylbenzyl chloride) as a 60:40 mixture of meta- and para-$CH_2Cl$ isomers can be purchased from Sigma Aldrich, Cat. No. 182532-25G and -50G with a $M_w$/Number Average Molecular Weight ($M_n$) of about 100,000/50,000. Other polymers (random, block, triblock, etc.) derived from chloromethylstyrene, including copolymers, with methyl methacrylate, butyl acrylate, styrene, α-methyl styrene, butadiene, isoprene, ethylene, propylene, butylene, and isobutylene are commercially available from Polymer Source, Inc. Poly(styrene-block-N,N-dimethylaminoacrylate) is also contemplated that is commercially available from Polymer Source, Inc. Poly(chloromethylstyrene) has been made by TEMPO-mediated free radical polymerization as described in U.S. Pat. No. 5,907,001 to Foucher et al., assigned to Xerox. Dimethylamino-substitution of poly (chloromethylstyrene) is also contemplated as a binder as described in S. D. Alexandratos et al., "Amination of poly (vinylbenzyl chloride) with N,N-dimethylformamide," Macromolecules, 2003, 36, 3436-3439. Diethylamino-substitution of poly(chloromethylstyrene) is described in Y. Tang, et al, "Preparation of monodisperse core-shell microspheres with surface antibacterial property employing N-(4-vinylbenzyl)-N,N-diethylamine hydrochloride as surfmer," International Journal of Polymeric Materials and Polymeric Biomaterials, 65:3, pp. 143-150 (2016). Homopolymers and co-polymers and the like can be made by anionic, bulk, emulsion, free radical, group transfer, interfacial, living, solution, slurry, solid phase, and the like. Nucleophilic displacement of chloromethyl groups is described in W. G. Lloyd et al., "Nucleophilic displacements upon pol(vinylbenzyl chloride)," Journal of Applied Polymer Science, 7, 2025-2033 (1963).

The acid scavenging binder polymer including a nitrogen-containing acid trapping moiety may be blended with other traditional binders, such as polyvinylidene difluoride (PVDF), ethylene propylene diene monomer (EPDM) rubber, or carboxymethoxyl cellulose (CMC), a nitrile butadiene rubber (NBR), lithium polyacrylate (LiPAA), sodium polyacrylate (NaPAA), sodium alginate, lithium alginate, and the like and used in the fabrication of positive and negative electrodes.

The present disclosure thus provides an electrochemical device including a first electrode, a second electrode having an opposite polarity from the first electrode, a porous separator, such as a nano-porous or micro-porous separator, and an electrolyte containing an acid or capable of forming an acid. In certain aspects, the first electrode may include a transition metal compound; so that transition metal ions can be generated that include nickel ions, cobalt ions, chromium ions, manganese ions, iron ions, vanadium ions, and combinations thereof. The transition metal may be manganese in certain variations, so that the first electrode includes the positive electrode includes an active material containing a transition metal ion, which may be selected from the group consisting of: manganese, nickel, cobalt, and combinations thereof. In certain variations, the transition metal is manganese (Mn) and the electroactive material is selected from the group consisting of: lithium manganese oxide ($Li_{(1+x)}Mn_{(2-x)}O_4$), where $0 \leq x \leq 0.2$, lithium manganese nickel oxide ($LiMn_{(2-x)}Ni_xO_4$), where $0 \leq x \leq 1$, lithium nickel manganese cobalt oxide ($Li(Ni_xMn_yCo_z)O_2$), where $0 \leq x \leq 1$, $0 \leq y \leq 1$, $0 \leq z \leq 1$, and $x+y+z=1$, $LiNi_{0.33}Mn_{0.33}Co_{0.33}O_2$, $LiNi_{0.5}Mn_{0.2}Co_{0.3}O_2$, $LiNi_{0.6}Mn_{0.2}Co_{0.2}O_2$, $LiNi_{0.8}Mn_{0.1}Co_{0.1}O_2$, $LiMn_{1.5}Ni_{0.5}O_4$, $LiMn_2O_4$, and combinations thereof. Stabilizing elements, such as Al, Ti, Cr, and Si can be added to these formulations with atomic fractions not exceeding 0.1, for example, $Li_{(1+x)}Mn_{(2-x-y-z)}Al_xCr_zO_4$.

As discussed above, the present technology is particularly advantageous for use with lithium manganese oxide based positive electrode active materials, such as spinel $LiMn_2O_4$, spinel $LiMn_{1.5}Ni_{0.5}O_4$, and Li-rich oxygen deficient lithium manganese-nickel-cobalt oxide materials with layered structure. It is desirable to prevent deposition of transition metals ions, like manganese ($M^{x+}$ (x=2, 3) on negative electrodes, which otherwise can accelerate the electrolyte decomposition and loss of electroactive lithium ions to detrimentally impact the solid electrolyte interphase (SEI) layer and thus reduce electrochemical cell performance.

The electrochemical cell further includes a polymer including an acid trapping moiety including a nitrogen-containing group selected from an amine group, a pyridine group, or combinations thereof. The acid trapping moiety is capable of participating in a Lewis acid-base neutralization reaction with the acid, where at least one of the first electrode, second electrode, or separator includes the polymer.

Figure 2:
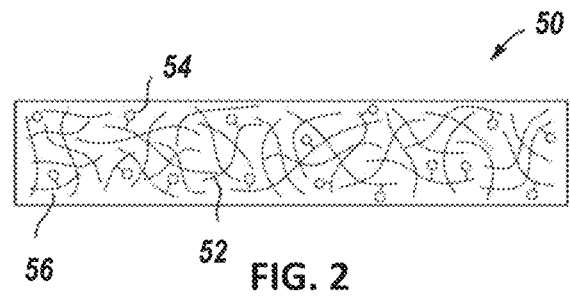
FIG. 2 is a schematic, cross-sectional view of an example of a porous separator formed with an example of a polymer including a nitrogen-containing acid trapping group disclosed herein.
Figure 3:
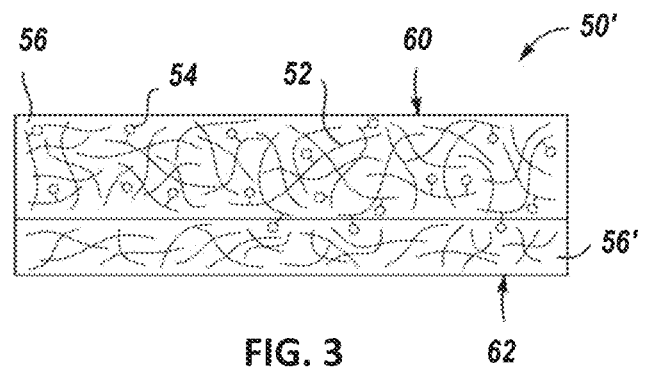
FIG. 3 is a schematic, cross-sectional view of an example of a porous separator including a porous membrane coated with a porous film of an example of a polymer including a nitrogen-containing acid trapping group disclosed herein.
Figure 4:
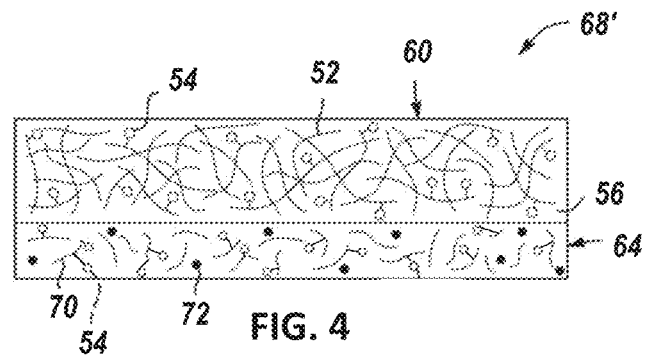
FIG. 4 is a schematic, cross-sectional view of an example of a positive electrode including a structure coated with a porous film of an example of a polymer including a nitrogen-containing acid trapping group disclosed herein.

With reference to FIGS. 2-4, the nitrogen-containing acid-trapping moiety can be implemented by inclusion into materials of the separator, as coatings or as matrix materials, by coating them onto electrodes, or by their inclusion into electrodes as binders, by way of example. In certain variations, the nitrogen-containing acid-trapping moiety is provided in one or more of the following locations.

The nitrogen-containing acid-trapping moiety may be grafted as a pendant group onto a polymer forming the porous separator. In other variations, a polymer including the nitrogen-containing acid-trapping moiety may be coated on or disposed within pores of the porous separator. Thus, such variations contemplate use of separators made of polymers that are functionalized with nitrogen-containing acid-trapping groups whose sole function is to scavenge HF and other acid species generated during Li-ion battery (LIB) operation, through a scavenging mechanism based on Lewis acid-base reactions.

In FIG. 2, acid scavenging binder polymer including a nitrogen-containing acid trapping group forms the lithium ion battery separator 50, optionally blended with another polymer (e.g., a polyolefin such as polyethylene or propyl propylene) that confers structural integrity to the separator. In this example, the separator 50 itself is a porous film including an acid scavenging binder polymer that is functionalized with a nitrogen-containing acid trapping moiety. In FIG. 2, the polymer backbone is represented by reference numeral 52 while the nitrogen-containing acid trapping group is bonded thereto is represented by reference numeral 54, and the open pores in the film are represented by reference numeral 56. While not shown, other components may be added to the separator 50, such as binder components.

As illustrated in FIG. 2, this example of the separator 50 has pores 56 formed throughout the polymer backbone 52. The nitrogen-containing acid trapping group 54 is attached to the polymer backbone 52. In this example, the bonded nitrogen-containing acid trapping group 52 is part of the separator matrix and may be present inside of the open pores 56. In examples of the present disclosure, polymeric nitrogen-containing acid trapping groups may also be used, e.g., as filler material within the separator matrix and/or operatively disposed within pores 56 of separator 50 (e.g., as particles or beads (separate from the separator matrix) inside the pores 56 of the separator 50).

Referring now to FIG. 3, the polymer-bound nitrogen-containing acid trapping group is in the form of a coating 60 on a nanoporous or microporous membrane 62. Together, the coating 60 and the nanoporous or microporous membrane 62 form another example of the lithium ion battery separator 56'. Because the coating 60 is formed on the surface of a nanoporous or microporous membrane 60, some of the polymeric nitrogen-containing acid trapping group 54 may, in some instances, migrate into the pores 56' of the nanoporous or microporous membrane 62.

The polymeric nitrogen-containing acid trapping group may be formed as described in reference to FIG. 3, and includes the nitrogen-containing acid trapping group 54 attached to the polymer backbone 52. The resulting coating 60 also includes the pores 56. In an example of coating the membrane 62 with the polymeric nitrogen-containing acid trapping group 54, the polymer-bound nitrogen-containing acid trapping group 54 may be suspended in a solvent, such as tetrahydrofuran, and this suspension may be deposited on or otherwise exposed to the membrane 62. For example, a wet film of the suspension may be applied to the membrane 62.

In other aspects, a polymer including the nitrogen-containing acid-trapping moiety may be coated on or disposed within pores of the first electrode. A nitrogen-containing acid-trapping moiety may be grafted as a pendant group onto a binder in the first electrode. A polymer including the nitrogen-containing acid-trapping moiety may be coated on or disposed within pores of the second electrode. A nitrogen-containing acid-trapping moiety is grafted as a pendant group onto a binder in the second electrode, similar to the binders listed above for the first electrode.

Referring now to FIG. 4, the polymeric nitrogen-containing acid trapping group 54 is in the form of a coating 60 on a structure 64. Together, the coating 60 and the structure 64 form an example of a positive electrode 68 or alternatively a negative electrode. As mentioned above, the polymer-bound nitrogen-containing acid trapping group includes the nitrogen-containing acid trapping group 54 attached to the polymer backbone 52. The resulting coating 60 also includes the pores 56. In an example of coating the structure 64 with the polymeric nitrogen-containing acid trapping group, the polymeric nitrogen-containing acid trapping group 54 may be suspended in tetrahydrofuran or another suitable solvent, and this suspension may be deposited on or otherwise exposed to at least the surface of the structure 64 to be positioned adjacent to a nanoporous or microporous membrane 60 in a lithium ion battery. While not shown in FIG. 4, it is to be understood that the entire structure 64 may be encapsulated in the coating 60.

In an example, as shown in phantom in FIG. 4, the nitrogen-containing acid trapping group 54 may be attached to the binder 70 of the structure 64 (e.g., electrode). The binder 70 of the structure 64 may be any polymeric binder that is capable of structurally holding the lithium-based active material 72 together and may be any of those described previously above.

In yet another variation, while not shown, a ceramic coated base separator may have a polymer including a nitrogen-containing acid-trapping moiety that fills the pores of only the ceramic coating.

Notably, the polymer including a nitrogen-containing acid trapping moiety may be used in any combinations of these variations, whether in the separator, positive electrode, and/or negative electrode.

In certain aspects, the present disclosure provides methods of scavenging acid species in the electrolyte solution during the operation of a lithium-ion electrochemical cell. The method may include contacting an electrolyte with a polymer including a nitrogen-containing acid-trapping moiety selected from the group consisting of: an amine group, a pyridine group, and combinations thereof. The electrolyte contains an acid or is capable of forming the acid. The electrolyte includes a lithium salt, such as lithium hexafluorophosphate ($LiPF_6$) and one or more solvents. The nitrogen-containing acid-trapping moiety scavenges acidic species present in the electrolyte solution by participating in a Lewis acid-base neutralization reaction. The electrolyte is contained in the electrochemical cell that further includes a first electrode, a second electrode having an opposite polarity from the first electrode, and a porous separator. The method may further include cycling lithium ions through the separator and electrolyte from the first electrode to the second electrode, so that at least a portion of acid generated during the cycling is scavenged by the polymer including a nitrogen-containing acid-trapping moiety. The acid-scavenging polymer neutralizes the acidic environment inside the cell, which in turn minimizes parasitic battery performance degradation reactions.

Accordingly, the dissolution of transition metal ions from the positive electrode through acid attach and consequently the poisoning of the negative electrode in the lithium-ion battery may be reduced or prevented by incorporating a polymer including a nitrogen-containing acid-trapping moiety disclosed herein into the battery or lithium-ion electrochemical cell. The nitrogen-containing acid-trapping moiety tethered to a polymeric material can react with acid species and prevent TM cations, like cations of manganese (e.g., $Mn^{+2}$, $Mn^{+3}$, $Mn^{+4}$), iron (e.g., $Fe^{2+}$, $Fe^{3+}$), chromium (e.g., $Cr^{2+}$, $Cr^{3+}$), cobalt (e.g., $Co^{2+}$, $Co^{3+}$), nickel (e.g., $Ni^{2+}$, $Ni^{3+}$, $Ni^{4+}$), and/or vanadium (e.g., $V^{3+}$, $V^{4+}$, $V^{5+}$). By minimizing the presence of acid and, consequently, preventing or minimizing transition metal ion deposition at the negative electrode, more ionically conductive and electronically insulating protective surface films are formed on Li-ion battery electrodes early on in the cell life, thus improving the overall power performance of Li-ion batteries. In this manner, surface films with lower resistance on the positive and negative electrodes of a Li-ion battery are provided and maintained throughout the Li-ion battery useful life, which improves the power performance as well as increases the charging and discharging rates at all temperatures.

The lithium ion electrochemical cell incorporating an acid scavenging polymer having a nitrogen-containing acid trapping moiety can minimize or prevent deposition of metals onto the electrode and minimize or prevent or degradation of a solid electrolyte interface (SEI) layer to substantially maintain the cell capacity during charging and discharging of the lithium ion battery. By substantially maintain charge capacity, it is meant the charge capacity is 80% of its initial charge capacity after about 100 charge-discharge cycles.

For example, where the electrochemical device includes an acid scavenging polymer having a nitrogen-containing acid trapping moiety, an electrode including a transition metal, like manganese, and an electrolyte including an acid or capable of forming an acid during operation of the electrochemical cell (e.g., containing a lithium salt like lithium hexafluorophoshate ($LiPF_6$)), the electrochemical cell may maintain 80% of its initial charge capacity after 100 cycles during cycling with 100% depth-of discharge at a rate corresponding to 3 hours charging or discharging time as the electrochemical cell or battery is operated, for example, for at least greater than or equal to about 500 hours of battery operation, optionally greater than or equal to about 750 hours of battery operation, optionally greater than or equal to about 1,000 hours of battery operation, and in certain aspects, greater than or equal to about 1,200 hours or longer of battery operation (active cycling).

In one variation, the electrolyte prior to cycling is believed to have an acid concentration of less than or equal to about 10 ppm, which reacts with the nitrogen-containing acid-trapping moiety acid.

In certain aspects, the lithium ion electrochemical cell incorporating an acid scavenging polymer having a nitrogen-containing acid trapping moiety for scavenging acid via a Lewis Acid-Base reaction can minimize the dissolution of transition metal ions from the positive electrode by acid attack, to minimize or prevent the migration and subsequent deposition of transition metal ions at the negative electrode, in order to prevent or minimize capacity fade in the cell due to catalytic reactions that consume electrolyte solution components (solvent molecules and $PF_6^-$ anions) as well as electroactive lithium ions, which lead to the thickening of the SEI, and thus to increase the useful lifetime of the electrochemical cell.

For example, where a lithium-ion battery (LIB) includes an acid scavenging polymer having a nitrogen-containing acid trapping moiety and an electrode including a transition metal, like manganese, the LIB has the following advantages: (1) increased durability (e.g., cycle and calendar life), (2) improved overall power performance by enabling battery operation at above-ambient temperatures (e.g., up to +80° C.), (3) improved power performance at sub-ambient temperatures (e.g., down to −40° C.), (4) a lower system cost through simplification or possible elimination of a thermal management system and/or (5) charging at high rates without lithium plating.

In one variation, an acid scavenging polymer including a nitrogen-containing acid trapping moiety for a separator include nanoparticles having an average diameter of about 100 nm formed of the commercial resin REILLEX™ 425, having 25% crosslinked divinylbenzene backbone functionalized with 4-vinylpyridine. As noted previously, pyridine serves as a Lewis base that can efficiently scavenge acidic species and is far more effective than ion exchange mechanisms for scavenging trace amount of acids.

EXAMPLES

Various embodiments of the inventive technology can be further understood by the specific examples contained herein. Specific Examples are provided for illustrative purposes of how to make and use the compositions, devices, and methods according to the present teachings and, unless explicitly stated otherwise, are not intended to be a representation that given embodiments of this invention have, or have not, been made or tested.

An acid scavenging polymer including a nitrogen-containing acid trapping moiety for a separator includes nanoparticles having an average diameter of about 100 nm formed of the commercial resin REILLEX™ 425, having 25% crosslinked divinylbenzene backbone functionalized with pyridine that serves as a base in a Lewis acid-base reaction with any acid species present in the lithium ion battery. A functionalized separator including divinylbenzene with pyridine functional groups is tested as being representative for two distinct classes of cell performance degradation mechanisms: a positive electrode material of Lithium Manganese Oxide (LMO—$LiMn_2O_4$)‖a negative electrode material of graphite (where Mn dissolution initiates one of two major performance degradation mechanisms) and a positive electrode material of Lithium Nickel Cobalt Manganese Oxide ($LiNiCoMnO_2$—NCM-622)‖a negative electrode material of graphite (where TM dissolution plays only a minor, if any role in performance degradation). As discussed in the examples herein, the acid scavenging functional separators provide benefits for cells with both LMO and NMC-622 positive electrodes. This indicates that the usefulness of acid-scavenging separators is not limited to cell chemistries suffering from TM ions dissolution issues, but is advantageous for any Li-ion batteries in which an acidic environment promotes various parasitic reactions, as in all $LiPF_6$-based electrolyte solutions, or the vast majority of electrolyte solutions of practical importance.

Example A

Fabrication of acid scavenging functional separators. The acid-scavenging functional separator is fabricated in-house by a phase-inversion method, using poly (vinylidene fluoride-hexafluoropropylene) (PVDF-HFP) copolymer as matrix and REILLEX™ 425 (Sigma Aldrich) (having 4-vinylpyridine attached to a 25% cross-linked divinylbenzene backbone) acid scavenging resin as filler. Thus, the present methods can form an acid-scavenging polymer for a separator that is a composite of a PVDF-HFP polymer and a copolymer of 4-vinylpyridine and divinylbenzene. Unless stated otherwise, all commercial materials are used in these examples without any further purification or modification, and all tests are performed at room temperature (about 30° C.).

Acetone (Sigma Aldrich) and water are chosen as true solvent and anti-solvent, respectively, to fabricate the phase-inversion functional separator containing the proton scavenging resin REILLEX™ 425 (Sigma Aldrich), (having 4-vinylpyridine attached to a 25% cross-linked divinylbenzene backbone) as functionalized filler and PVdF-HFP copolymer (Solvay) as binder. An amount of 3 g PVdF-HFP copolymer is dissolved in 81 g acetone at 35° C., under constant stirring for 3 hours. Water (10 g) is then added drop-wise into the stirred acetone-copolymer solution, until it becomes transparent. 6 g of finely ground proton scavenging resin filler is added to the acetone-copolymer solution and stirring continues for 12 hours at room temperature. The optimal amounts for the copolymer, resin filler, true solvent and anti-solvent in the resulting suspensions are 3%, 6%, 81% and 10%, respectively. The copolymer-filler suspensions are cast onto glass plates using a doctor blade with a 200 μm gap. The composite membrane is then dried for 14 hours at 80° C. under vacuum, subsequent to the evaporation of the solvent mixture in air. The copolymer-to-filler ratio in a dry separator membrane is 1:2, thus and loading of the separator with proton scavenging filler (REILLEX™ 425 material) is about 2 mg·cm$^{-2}$ The average thickness and porosity of the functional separator are 30 μm and about 43%, respectively. Note that the average thickness, porosity and electrochemical stability of the functional separator from the present study are similar to those of the commercial Celgard 2500 polypropylene separator used as comparison baseline.

The surface morphology of the functional acid-scavenging separator is assessed by HR-SEM, which shows a nonporous PVDF matrix with macropores of about 4 to 20 μm in size filled with REILLEX™ 425 resin particles having 100 nm average size that in turn create a nanopores network. The resin particles are hydrophilic and agglomerate inside the macro pores during the membrane fabrication process, because such pores are generated by the anti-solvent (water) evaporation during the fabrication of the membrane by phase-inversion. The surface roughness of the membranes fabricated by the phase-inversion method differs on the opposite sides of the separator. The surface towards the glass is smoother than the surface towards the air, due to the differences between the surface tension of the solid-liquid and liquid-air interphases, respectively.

Example B

Composite LMO positive electrodes are prepared with active material from Yunnan Yuxi Huilong Technology Co. Ltd., by spreading a slurry including a 1:1 w/w mixture of electrode components (85 wt. % active material, 10 wt. % Super P Li carbon black conductive filler from Imerys Ltd., 5 wt. % PVdF binder from Solvay) and N-methyl pyrrolidone (Sigma Aldrich) as dispersing solvent onto Al current-collectors, using a doctor blade with a 100 μm gap.

Composite NCM-622 positive electrodes are prepared in similar fashion by using active material from BASF, and maintaining the following composition; 80 wt. % active material, 10 wt. % Super P Li carbon black conductive filler from Imerys Ltd. and 10 wt. % PVdF binder from Solvay. Positive electrode active materials loadings are about 10.8 and about 5.5 mg·cm$^{-2}$ for LMO and NCM-662, respectively.

Composite graphite negative electrodes are prepared in a similar way by doctor-blading a slurry consisting of electrode solids (90 wt. % SMG graphite, Hitachi Inc.; 3 wt. % carbon black Super P Li, Imerys Ltd.; 7 wt. % PVdF binder, Solvay) and N-methyl pyrrolidone (Sigma Aldrich) onto on 10 μm thick Cu foil current collectors. Negative electrode active material loadings on the current collectors are about 4.5 and about 2.8 mg·cm$^{-2}$ against the LMO and NCM-622 electrodes, respectively. All positive and negative electrodes are vacuum dried at 120° C. for 14 hours.

The performance of the acid scavenging functional separator prepared in accordance with certain aspects of the present disclosure is subjected to preliminary tests in LMO∥Li and NCM-62211∥Li coin cells (model: 2325, CNCR, Canada; 14 mm diameter electrodes) containing 1M LiPF$_6$/EC:EMC (3:7 v/v) electrolyte solution (Solvionic). Pouch cells (30 mm×35 mm electrodes) with LMO∥graphite and NCM-622∥graphite electrodes and the same electrolyte solution are assembled for further performance testing. The geometric areas of separators are 2.83 and 16 cm$^2$, respectively for coin and pouch cells. The performance of cells containing the functional separators is compared against cells containing a conventional polypropylene separator (CELGARD™ 2500) as comparison baseline in both coin and pouch formats. All cells are assembled inside an argon filled glove box with moisture and oxygen levels <1 ppm.

Cycling tests are carried out in ARBIN™ Model BT2000 multichannel battery cycler. Electrochemical AC impedance measurements are conducted on all cells using a SOLARTRON™ Instruments 1225 HF frequency response analyzer and a SOLARTRON™ Instruments 1287 electrochemical interface, both after three formation cycles (at C/10 rate) and after performing 4 weeks of cycling at C/5 rate, prior to their disassembly. Impedance spectra are collected at open circuit voltage in the discharged state (at ~3.2 V), with a 5 mV excitation amplitude, over the 100 kHz to 10 mHz frequency range.

After the completion of the electrochemical AC impedance measurements subsequent to the cycling tests, all cells are immediately disassembled, and the amounts of transition metals (Mn, Ni and Co) in negative electrodes are determined by inductively coupled plasma optical emission spectroscopy (ICP-OES, ULTIMA 2™ instrument from Jobin-Yvon Horiba). In the case of LMO∥Li and NCM-622∥Li cells, the transition metal contaminated Li electrodes are dissolved in 10 ml of double distilled deionized (DD-DI) water. 1 ml aliquots are then diluted in 1=9 ml of DD-DI water and the amounts of dissolved transition metals are determined by inductively coupled optical emission spectroscopy (ICP OES). The Cu-supported graphite negative electrodes harvested from LMO∥graphite and NCM-622∥graphite cells are first dissolved in 5 ml aqua regia (HCl:HNO$_3$=3:1). The transition metal containing solution is transferred to 50 ml volumetric flasks which are filled with DD-DI water and transition metal concentrations are then determined by ICP-OES. The positive electrodes are collected after disassembly of the full cells, washed with DMC, and X-ray diffraction (XRD) analysis is performed with them using a Bruker Inc. (Germany) AXS D8 ADVANCE diffractometer (reflection θ-θ geometry, Cu Kα radiation, receiving slit 0.2 mm, high-resolution energy-dispersive detector), maintaining 0.5 s/step step time and 0.049° step size. The separators from the LMO∥graphite and NCM-622∥graphite cells are washed by DMC after disassembly and are subjected to FTIR measurements with a model iS50 NICOLET™ instrument. Surface images of functional separator are collected in their pristine state as well as after cycling using a MAGELLAN 400L, FEI™ high resolution scanning electron microscope (HR-SEM). All separators are sputtered with Au before the imaging, due to the insulating nature of the separators.

Example C

Normalized discharging capacity and capacity loss rate in LMO∥graphite cells comparing a comparative baseline separator (CELGARD™ 2500 designated 90) and an acid-scavenging separator prepared according to certain aspects of the present disclosure including divinylbenzene and poly-4-vinylpyridine (poly-4VP) commercially available as REILLEX™ 425 designated 92, during a 4 week cycling test at 0.2 C rate and 55° C. temperature is shown in FIG. 5. In FIG. 5, the left y-axis 100 shows relative discharging capacity/%, the right y-axis 102 shows % initial capacity loss per cycle, while the x-axis 104 shows cycle index.

Example D

FIG. 6 shows normalized discharging capacity and capacity loss rate in NCM-622∥graphite cells comparing a comparative baseline separator (CELGARD™ 2500 designated 110) and an acid-scavenging separator prepared according to certain aspects of the present disclosure (REILLEX™ 425 that is a poly(25% divinylbenzene-75% 4-vinylpyridine)) designated 112, during a 4 week cycling test at 0.2 C rate and 55° C. temperature. In FIG. 6, the left y-axis 120 shows relative discharging capacity/%, the right y-axis 122 shows % initial capacity loss per cycle, while the x-axis 124 shows cycle index.

Example E

Electrochemical testing and post-disassembled analysis of systems having graphite as negative electrodes are shown for LMO∥graphite and NMC-622∥graphite cells having an acid-scavenging separator prepared according to certain aspects of the present disclosure for comparison. The cells include a comparative baseline separator (CELGARD™ 2500) and a separator including an acid-scavenging separator prepared according to certain aspects of the present disclosure including poly-4-vinylpyridine (poly-4VP-REILLEX™ 425 that is a poly(25% divinylbenzene-75% 4-vinylpyridine)). The cells have an electrolyte of 1 M LiPF$_6$ in a cosolvent system of ethylene carbonate:dimethyl carbonate in a 1:1 weight ratio. The graphite electrode is an SMG electrode available from Hitachi.

Cycling data at elevated temperature (55° C.) for LMO∥graphite and NMC-622∥graphite cells are presented in FIG. 7. All LMO and NMC-622 half-cells are subjected to three formation cycles at C/10 rate and 30° C., then to 4 weeks of cycling at C/5 rate and 30° C. or 55° C. temperature (see FIG. 7 for cycling at C/5 rate cycling performance at 55° C.). The comparative baseline separator (CELGARD™ 2500) is designated 130 for the LMO-graphite cell and 132 for the NMC 622-graphite cell, while the separator including an acid-scavenging separator prepared according to certain aspects of the present disclosure is designated 134 for the LMO-graphite cell and 136 for the NMC 622-graphite cell. In FIG. 5, the left y-axis 140 shows relative discharging capacity/%, the right y-axis 142 shows % initial capacity loss per cycle, while the x-axis 144 shows cycle index. As can be seen, better capacity retention occurs for the separators with acid scavenging ability as compared to conventional separators, with 60% versus 29% of initial capacity with LMO and 83% versus 59% of initial capacity of NMC622.

To assess the benefits of an acid scavenging separator for cell performance, only high-temperature cycling data is assessed, because of the accelerated generation of acidic species in the electrolyte solutions at above ambient temperatures. Over the duration of 4 weeks of cycling at 0.2 C rate, the LMO∥graphite cells with baseline and functional separators experience 71% and 39% capacity losses. Otherwise stated, at end-of-test (EOT) the LMO∥graphite cells retain 28 mAh·g$^{-1}$ capacity with CELGARD™ 2500 and 58 mAh/g capacity with REILLEX™ 425 material, from the initial 96 mAh·g$^{-1}$. Similarly, the NCM-622∥graphite cells with conventional baseline and functional acid-scavenging separators lose 42% and 17% of their initial capacity, respectively. In terms of absolute capacity, the LMO∥graphite cells retain 99 mAh·g$^{-1}$ with CELGARD™ 2500 and 141 mAh·g$^{-1}$ with REILLEX™ 425 material, from their initial 175 mAh·g$^{-1}$.

Note also that the Faradaic efficiency is higher in the cells with REILLEX™ 425 separators compared to the cells with CELGARD™ 2500, for the same electrode chemistries, respectively. Representations of the data from the cycling tests in terms percent initial discharging capacity, as well as percent capacity losses per cycle, as functions of cycle index are given in FIGS. 5 and 6 (Examples C and D above). These figures indicate that the capacity loss per cycle is much reduced by REILLEX™ 425 material after 15 test cycles in the LMO∥graphite cells and after only 5 cycles in the NCM-622∥graphite cells, when compared to cells with CELGARD™ 2500 and the same electrode chemistries. The benefits from the acid scavenging functional separator are clearly more pronounced for cells with LMO electrodes compared to cells with NMC-622 electrodes, due to the significant consequences of Mn ions dissolution from LMO. The main causes of the capacity fading in LMO∥graphite cells are the depletion of electrochemical active Li$^+$ ions in LMO and underutilization of cell capacity due to increase in cell resistance. The excessive Mn ions dissolution from LMO, followed by their migration to and deposition on the graphite negative electrodes promotes malignant SEI growth, hence thickening, along with excessive consumption of electrochemically active Li$^+$ ions. This interpretation is also supported by the considerably lower Faradaic efficiency values experienced during high temperature cycling by the LMO∥graphite cells with the baseline conventional separator.

Figures 8A, 8B, 8C, 8D:
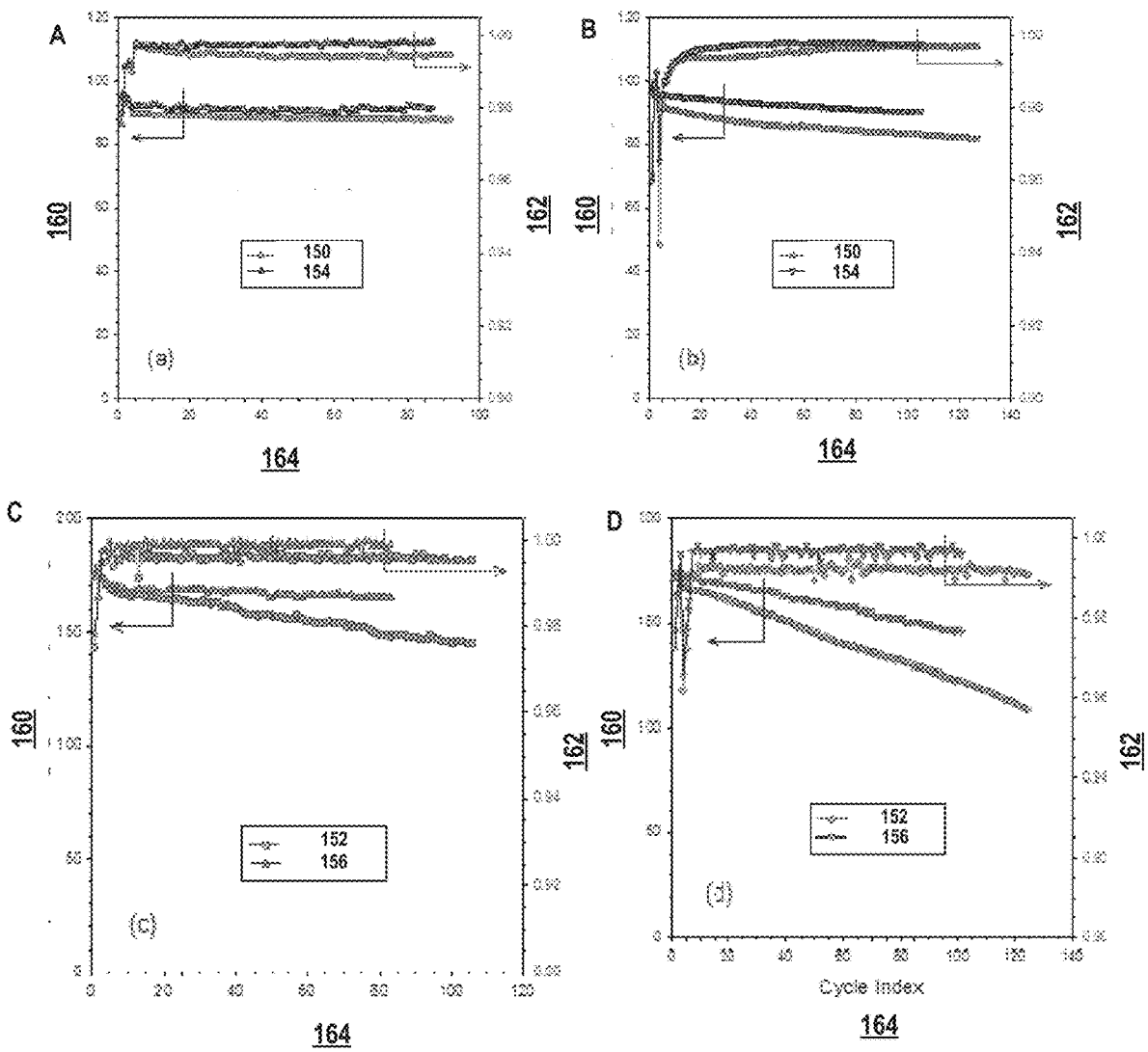
Figures 9A, 9B, 9C, 9D:
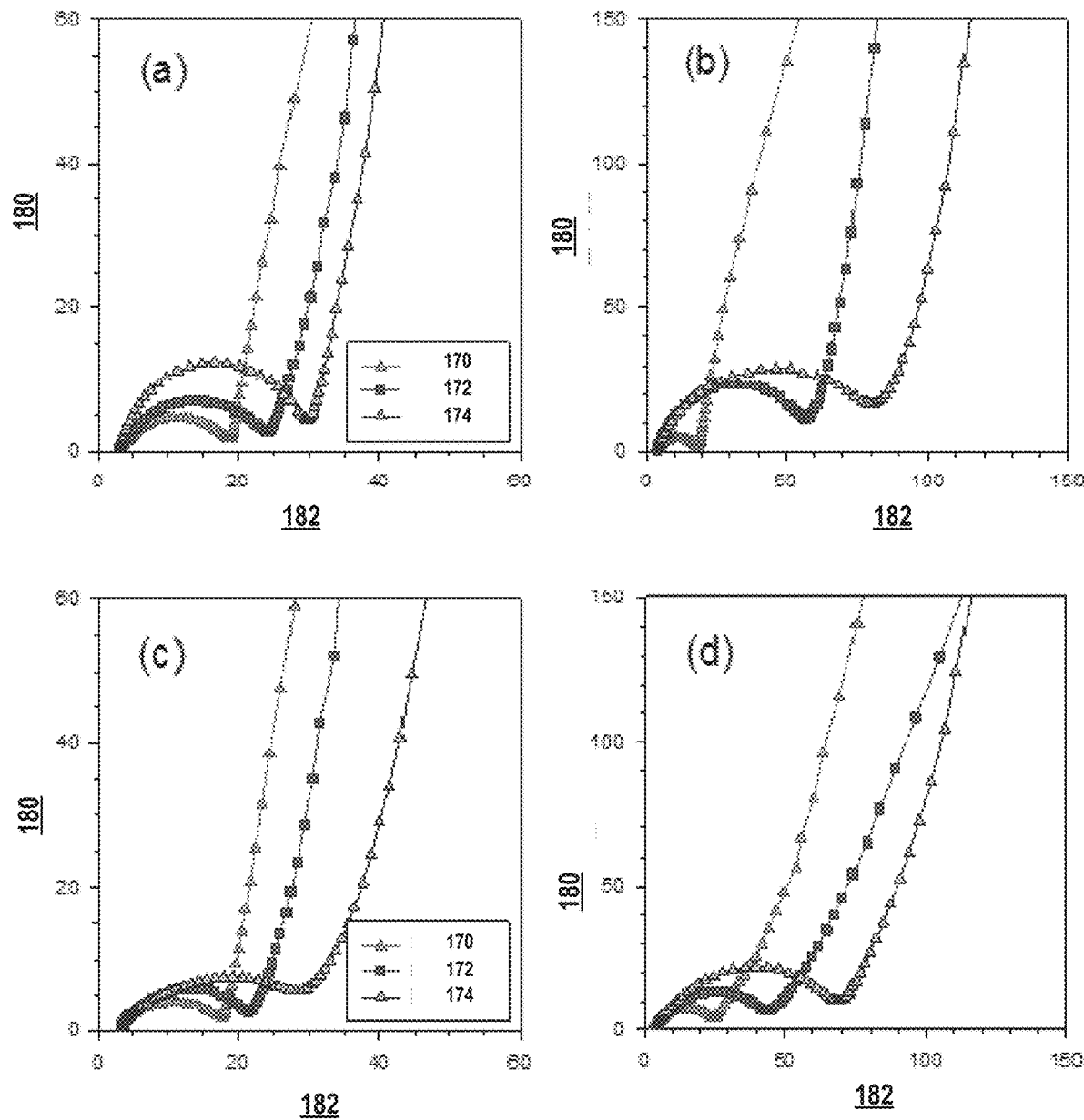

Finally, it is noteworthy that a minimal capacity fading is observed in LMO∥Li cells during cycling at both ambient and above ambient temperatures because the large excess of source of Li$^+$ ions represented by the Li electrodes masks the net electrochemical active Li$^+$ loss occurring for LMO∥graphite cells (see FIGS. 8A-8D). In FIGS. 8A-8D, the comparative baseline separator (CELGARD™ 2500) is designated 150 for the LMO-lithium cell and 152 for the NMC 622-lithium cell, while the separator including an acid-scavenging separator prepared according to certain aspects of the present disclosure is designated 154 for the LMO-lithium cell and 156 for the NCM 622-lithium cell. In FIGS. 8A-8D, the left y-axis 160 shows relative discharging capacity/%, the right y-axis 162 shows Faradaic efficiency, while the x-axis 164 shows cycle index. FIGS. 8A-8B show the LMO-lithium cell cycling at 30° C. and 55° C., respectively. FIGS. 8C-8D show the NMC-lithium cell cycling at 30° C. and 55° C., respectively.

The acid scavenging functional separator suppresses the main cause for Mn ions dissolution by reducing the acidic environment inside the LMO/graphite cells, leading to better capacity retention. The suppression of Mn ions dissolution is also verified by the elemental (Mn) analysis of the graphite negative electrodes and separators from the LMO∥graphite and NCM-622∥graphite cells after completion of cycling tests, as shown in Table 1. Table 1 shows amounts of TM ions found on the graphite electrodes at the end of the cycling tests of LMO∥graphite and NCM-622∥graphite cells with conventional CELGARD™ 2500 and acid scavenging separators prepared in accordance with Example A above. Note that TM amounts in all the separators are below the detection limit of ICP-OES.

TABLE 1

| | TM Amount, ppm Positive Electrode | | | |
| | NCM-622 Transition Metal | | | LMO |
| Separator Type | Mn | Ni | Co | Mn |
|---|---|---|---|---|
| REILLEXTM 425 + PVDF-HFP | 102 | 0 | 0 | 250 |
| CELGARD ™ 2500 | 167 | 22 | 10 | 1194 |

Because no TM ions are detected with the baseline or functionalized separators, one may conclude that all the TM ions dissolved from the positive electrodes are deposited onto the graphite electrodes of the respective cells during the cycling test. Note that the acid scavenging functional separator reduces the amount of Mn dissolved from LMO by a factor of 4.8 compared to the cell with the baseline separators and by 39% the amount of Mn dissolved from the NCM-622 electrode of the NCM-622||graphite cell compared to the cell with the baseline separator. Ni and Co amounts of 22 and 10 ppm, respectively, in the graphite electrode of the baseline NCM-622||graphite cell is reduced to immeasurable amounts by the functional acid-scavenging separator.

The benefits from the acid scavenging separator evidently can also be obtained for the performance of NMC-622||graphite cells, in which TM ions dissolution and migration issues are not the factors that limit the cell durability. Therefore, in this case the thickening of the SEI and the consumption of electroactive $Li^+$ ions are not the main mechanisms for performance degradation. This appears to be why greater capacity loss rates in NMC-622||Li cells is observed with the baseline separator relative to LMO||Li cells during cycling tests at both room and elevated temperatures (see FIGS. 8C-8D).

The major factors contributing to capacity loss in NCM-622 based cells are $Ni^{4+}$ catalyzed degradation reactions and the decrease in the stability of the crystal lattice through a layered to spinel phase transition, both occurring at high cell voltages during cycling. These two degradation mechanisms are equally effective in both NMC-622||Li and NMC-622||graphite cells, as they do not involve the consumption of electroactive $Li^+$ ions, thus the excess Li present in the NCM-622 half-cells cannot offer any advantage for improving capacity retention as in the case of LMO half-cells (see FIG. 8A). Nevertheless, the reduction in the acidity of the cell environment in cells with the acid-scavenging functional separator limits some of the parasitic reactions that are catalyzed by $Ni^{4+}$ ions, and this results in higher Faradaic efficiency and lower capacity fading in both NCM-622 half-cells and full NCSM-622||graphite cells, compared to the respective cells with baseline separators. This is why acid scavenging functional separators enable significant performance benefits also for positive electrode materials that do not suffer from TM ions' dissolution issues.

Example F

Electrochemical testing and post-disassembled analysis of systems having lithium as negative electrodes are shown for LMO||Li and NMC-622||Li cells having an acid-scavenging separator prepared according to certain aspects of the present disclosure (REILLEX™ 425 that is a poly(25% divinylbenzene-75% 4-vinylpyridine)) and comparative baseline separator (CELGARD™ 2500) for comparison.

All LMO and NMC-622 half-cells are subjected to three formation cycles at C/10 rate and 30° C., then to 4 weeks of cycling at C/5 rate and 30° C. or 55° C. temperature (see FIGS. 8A-8D for their cycling performance).

Example G

The capacity losses experienced by all tested half-cells from formation (F) to end-of-test (EOT) (4 weeks of cycling at C/5) in LMO||Li and NMC-522||Li cells are listed in Table 2. The acid-scavenging separator prepared according to certain aspects of the present disclosure includes REILLEX™ 425 that is a poly(25% divinylbenzene-75% 4-vinylpyridine), while the comparative baseline separator is CELGARD™ 2500.

TABLE 2

| Positive Electrode | Separator | Temperature, ° C. | Capacity Loss, % |
|---|---|---|---|
| LMO | Comparative conventional baseline | 30 | 2 |
| | | 55 | 10 |
| | Acid-scavenging | 30 | ~0 |
| | | 55 | 5 |
| NCM-622 | Comparative conventional baseline | 30 | 15 |
| | | 55 | 35 |
| | Acid-scavenging | 30 | 4 |
| | | 55 | 15 |

It is notable that all NCM-622 half-cells experience greater capacity losses than the LMO half-cells for any given separator and temperature. Substitution of the comparative conventional separator by an acid-scavenging separator prepared according to certain aspects of the present disclosure improves the performance of both LMO and NCM-622 half-cells, in agreement with Faradaic efficiencies that are higher for cells with functional than with baseline separators, both during cycling at 30° C. and 55° C., for both cell chemistries. The reductions in capacity losses by the substitution of the plain separator with the acid-scavenging one are greater for NCM-622 than for LMO.

Mn amounts at EOT at the end of 4 weeks of long cycling in the Li electrodes (in ppm of LMO mass in the cell) from the LMO half-cells are shown in Table 3. The transition metal amounts dissolved from NMC-622 are below the detection limit of the ICP-OES analysis.

TABLE 3

| Separator | Temperature, ° C. | Mn amount, ppm |
|---|---|---|
| Acid-scavenging | 30 | 93 |
| | 55 | 100 |
| Comparative conventional baseline | 30 | 569 |
| | 55 | 1050 |

Example H

Interfacial resistances related to electrochemical AC impedance data for LMO-Li cells are shown with (FIG. 9A) an acid-scavenging functionalized separator prepared according to certain aspects of the present disclosure including poly-4-vinylpyridine (poly-4VP) compared to (FIG. 9B) a conventional CELGARD™ 2500 separator along with NMC-622-Li cells with (FIG. 9C) an acid-scavenging functionalized separator prepared according to certain aspects of the present disclosure including poly-4-vinylpyridine (poly-4VP) compared to (FIG. 9D) a conventional CELGARD™ 2500 separator in FIGS. 9A-9D, respectively.

In FIGS. 9A-9D, an initial measurement is take that is designated 170, an end-of-test after testing conducted at 30° C. is designated 172, and an end-of-test measurement after testing conducted at 55° C. is designated 174. The left y-axis 180 shows $-Z''/\Omega$ and the x-axis 182 shows $-Z'/\Omega$.

FIGS. 9A-9D display the Nyquist plots of all cells after formation and the end of the cycling tests. Regardless of positive electrode (LMO or NMC-622), resistances during cycling, increase more at 55° C. than 30° C. It is also clear that acid-scavenging separators reduce cell impedances compared to plain conventional separators. Thus, acid-scavenging separators not only prevent or reduce transition metal ions dissolution by eliminating or reducing the acidity of the electrolyte solution in the cells, but also minimize the parasitic reactions during cell operation, which leads to impedance growth, at room and above-ambient temperatures.

Example I

Electrochemical AC impedance data for LMO-graphite cells with an acid-scavenging functionalized separator prepared according to certain aspects of the present disclosure including poly-4-vinylpyridine (poly-4VP) (FIG. 10A) compared to a conventional CELGARD™ 2500 separator is shown in FIG. 10B. Electrochemical AC impedance data for NMC622-graphite cells with an acid-scavenging functionalized separator prepared according to certain aspects of the present disclosure including poly-4-vinylpyridine (poly-4VP) (shown in FIG. 10C) compared to a conventional CELGARD™ 2500 separator is shown in FIG. 10D.

In FIGS. 10A-10D, an initial measurement is take that is designated 190 and an end-of-test is designated 192. The left y-axis 194 shows $-Z''/\Omega$ and the x-axis 196 shows $-Z'/\Omega$. FIGS. 10A-10D display the Nyquist plots for electrochemical AC impedance data for LMO∥graphite and NMC∥622/graphite cells containing functional (FIGS. 10A and 10C) and baseline separators (FIGS. 10B and 10D). Cell interfacial resistances are decreased by two times in cells with the acid scavenging functionalized separator after 4 weeks of cycling. The double depressed arcs are characteristic features of Li-ion cells, with the chords subtending the low and high frequency arcs assigned to charge-transfer and surface film resistances. The unambiguous assignment of the various features in EIS spectra to one or the other electrode is not possible for data from a 2-electrode cell. The discussion is confined to a qualitative comparison of cells with functional and baseline separators. The EIS data suggest that the acid scavenging separator is somewhat more effective in reducing the interfacial and film resistances in LMO∥graphite cells compared to NMC-622∥graphite cells. Reductions by a factor of about 2.5 are observed at EOT in cells with LMO and by a factor of about 2 in cells with NCM-622 containing acid scavenging separators, compared to the respective resistances in cells with baseline separators.

Mn ion dissolution from LMO damages the passivation of the SEI on the graphite electrodes, leading to excessive SEI growth, which in turn increases cell impedances. While the negligible TM (Mn, Ni, Co) ions dissolution from NMC-622 cannot drastically impair the SEI on graphite electrodes, other parasitic reactions due to acidic species lead to increases in cell impedances. Therefore, significant improvements in both capacity retention and characteristic impedances are observed in cells with either LMO and NMC-622 electrodes and an acid scavenging separator.

Example J

FTIR data provides evidence that the observed benefits arise from the scavenging of HF and other acidic species from the electrolyte solution, which results both in much reduced dissolution of manganese ions and lessened loss of electroactive Li+ ions, as evidenced, respectively, by post-mortem ICP-OES analyses of cell components and the negligible lattice shrinking in the positive electrode materials observed in XRD data.

The separators from the LMO∥graphite and NCM-622∥graphite cells are washed by DMC after disassembly and are subjected to FTIR measurements with a model iS50 Nicolet instrument. Surface images of functional separator are collected in their pristine state as well as after cycling using a MAGELLAN 400L, FEI™ high resolution scanning electron microscope (HR-SEM). All separators are sputtered with Au before the imaging, due to the insulating nature of the separators.

FIG. 11 displays the FTIR spectra of an acid scavenging functional separator prepared according to certain aspects of the present disclosure including poly-4-vinylpyridine (poly-4VP) in its pristine state (designated 200) and after its cycling in an LMO∥graphite (designated 202) or NCM-622∥graphite cell (designated 204). The y-axis 210 shows absorbance, while the x-axis 212 shows wavenumber/$cm^{-1}$.

Two trends are immediately apparent in the data: (1) a change in the vibration-rotation modes structure due to changes in chemical structure, manifested by a large decrease in the intensity of the band at 1,170 $cm^{-1}$ and the apparition of a strong double band with maxima at 1,800 and 1,780 $cm^{-1}$ as well as several weak bands between 1,450 and 1,650 $cm^{-1}$. Also, the band structure is significantly altered between the two samples. There is a well-defined shoulder at 1,040 $cm^{-1}$ in the sample cycled with NCM-622, which does not exists in the sample cycled with LMO, also added intensity (massive peak broadening) between 1,400 and 1600 $cm^{-1}$ for the sample cycled with NCM-622.

The strong double band which appears near 1,800 $cm^{-1}$, is due to C=N stretching mode, which is not present in pristine separator. Due to the resonance of aromatic pyridine ring, the bond order between carbon and nitrogen is below 2 in the pristine separator. Therefore, no C=N group is present in pristine state and thus the band for the C=N stretching mode is missing from the FTIR spectrum. On the other hand, the nitrogen in the pyridine ring chemically bonds with protons or Lewis acids during cell cycling (thus leading, e.g., from pyridine as precursor to pyridinium hydrofluoride as product). This leads to the loss of aromaticity and annulment of the resonance effect in the aromatic pyridine ring. The presence of the distinct double-band near about 1,800 $cm^{-1}$, typical region for the C=N group, confirms the acid scavenging role of the functional separator.

Example K

Cycling data for LNMO-graphite cells with a conventional CELGARD™ 2500 separator (designated 220), an acid-scavenging separator prepared according to certain aspects of the present disclosure including poly-4-vinylpyridine (poly-4VP) (designated 222), styrene-divinylbenzene copolymer functionalized with disodium salt of iminodiacetic acid (poly-IDANa$_2$) (designated 224) and a tetrasodium edetate (Na$_4$EDTA) (designated 226) are shown in the FIG. 12. In FIG. 12, the left y-axis 230 shows relative discharging capacity/%, the right y-axis 232 shows Faradaic efficiency, while the x-axis 234 shows cycle index. FIG. 12 shows the LNMO-graphite cell cycling at 30° C. at a C/5 rate and 4.0<U<4.85V.

Examples A-K provide comparative data for a new acid-scavenging functionalized polymeric separator based on a 4-vinylpyridine functionalized polymer. The acid-scavenging separators neutralize the acidic environment inside the cell, which in turn minimizes parasitic battery performance degradation reactions. Transition metal ions dissolution from positive electrode materials and loss of electroactive Li+, which shortens the life of Li-ion batteries. Acid-scavenging separators limit both the transition metal ions dissolution as well as other parasitic reactions initiated by acidic species, thus improving the battery durability. Besides showing that acid-scavenging separators significantly improve the high-temperature capacity retention of cells with LMO positive electrodes (a material known for its Mn-dissolution induced performance degradation), the beneficial effects of the acid-scavenging separator for cells with NMC-622 positive active material (for which transition metal ions dissolution is much reduced and therefore the associated performance degradation does not represent a prominent degradation mode) is also shown. The beneficial effects of acid scavenging separators for Li-ion battery performance are not limited solely to electrode chemistries which suffer from severe manganese or TM ions dissolution, but extend to a broader class of cell chemistries, due to their ability to suppress the performance degradation related to other parasitic reactions in cells.

Example L

Other examples of polymers including nitrogen-containing acid trapping groups for use as binders are discussed in the following examples. In this example, poly(4-vinylbenzyl chloride) is prepared with AIBN. With the use of a 500-mL separatory funnel, 4-vinylbenzyl chloride (Sigma-Aldrich Cat. No. 436887-100 ML, 1.083 g/cc), is washed with 0.1 wt. % sodium hydroxide (250 mL), and then with water (250 mL). The bottom layer of yellow, 4-vinylbenzyl chloride is then filtered through a bed of neutral alumina (E-Science, 90 activity, 70-230 mesh) to form a clear, colorless liquid (52.42 g). To a 1-liter, 3-neck flask equipped with a reflux condenser, argon inlet, a mechanical stirrer with a water-cooled jacketed bearing, and a stopper is added the washed 4-vinylbenzyl chloride (52.42 g, 0.3437 mol), toluene (400 mL) and 2,2'-azobis(2-methylproprionitrile) (Sigma-Aldrich Cat. No. 441090-100 G, 0.16 g, $9.74 \times 10^{-4}$ mol). The reaction vessel containing the reaction mixture is stirred under argon for 1 hour and then is heated under argon in an oil bath set at 75° C. using a Therm-O-Watch temperature controller ($I^2R$) for 16 hours. Toluene is removed from the reaction mixture using a rotary evaporator under reduced pressure (Welch model 1402B-01 vacuum pump) and the concentrate (100 mL) is added to isopropanol (2-liters) using a WARING™ blender to precipitate a white powder of poly(4-vinylbenzyl chloride) which is filtered and vacuum dried (10.09 grams, 19% yield).

Example M

Preparation of Poly(chloromethylstyrene) with TEMPO and BPO. The polymerization of chloromethylstyrene with 2,2,6,6-tetramethyl-1-piperidine-1-oxyl (TEMPO) and benzoyl peroxide (BPO) is described in D. A. Foucher, et al. "Process for the Preparation of Photopatternable Polymers," and U.S. Pat. No. 5,907,001 to Foucher et al., assigned to Xerox Corp. In Example I of U.S. Pat. No. 5,907,001, poly(chloromethylstyrene) with a degree of polymerization n of approximately 116, a $M_w$=23,400 and $M_n$=17,700 and a polydispersity of 1.32 is prepared in 65.4% yield. In Example II of U.S. Pat. No. 5,907,001, poly(chloromethylstyrene) with a degree of polymerization n of approximately 200, a $M_w$=41,600 and $M_n$=29,500 and a polydispersity of 1.4 is prepared in 62.1% yield. In Example III of U.S. Pat. No. 5,907,001, poly(chloromethylstyrene) with a degree of polymerization n of approximately 140, a $M_w$=26,300 and $M_n$=21,200 and a polydispersity of 1.41 is prepared in 61.2% yield.

Poly(chloromethyl styrene) [—$CH_2$—CH($C_6H_4CH_2Cl$)—]$_n$ wherein n is approximately 116 from Example I of U.S. Pat. No. 5,907,001, is prepared as follows. Into a 50-mL, 3-neck, round bottom flask equipped with an argon purge, reflux condenser, and mechanical stirrer is added a stable free radical agent 2,2,6,6-tetrmethyl-1-piperidine-1-oxyl (TEMPO, 104 mg, 0.671 mmol), a free radical initiator benzoyl peroxide (BPO 1.23 mg, 0.508 mmol), and a monomer, chloromethylstyrene (CMS, 20.5 g, 134 mmol). The solution is immersed half-way into a pre-heated oil bath (130° C.) and then stirred for 4 hours. The reaction mixture is then cooled to approximately 80° C. and diluted with 10 mL of toluene and 40 mL of tetrahydrofuran (THF). White polymer powder is recovered by precipitation of the diluted solution into 2 L of methanol and then filtration. The polymer is re-dissolved in THF and then precipitated a second time in methanol, filtered, and vacuum dried overnight at 60° C. The total recovered poly(chloromethylstyrene) is 13.4 g (65.4% yield) with size exclusion chromatography date data: $M_w$=23,400, $M_n$=17,700 and polydispersity (PD)=1.32. Example II of U.S. Pat. No. 5,907,001 uses TEMPO (70 mg, 0.451 mmol), BPO (83 mg, 0.342 mmol) and CMS (20.1 g, 132 mmol) and 130° C. Example III of U.S. Pat. No. 5,907,001 uses TEMPO (167 mg, 1.07 mmol), BPO (196 mg, 0.813 mmol) and CMS (20.1 g, 132 mmol) and 130° C. A random copolymer of CMS and styrene, [(—$CH_2$—CH{$C_6H_4CH_2Cl$})$_n$—(—$CH_2$—CH{$C_6H_5$})$_m$] where n is approximately 130 and m is approximately 15 is prepared as described in Example IV of U.S. Pat. No. 5,907,001 using TEMPO (147 mg, 0.671 mmol), BPO (147 mg, 0.606 mmol), styrene (2.93 g, 19.2 mmol) and CMS (18 g, 118 mmol) at 130° C. for 4 hours. The recovered co-poly(chloromethylstyrene-styrene) is 10.4 g (49.7% yield) has a $M_w$=26,400, $M_n$=21,200 and PD=1.24. Example V describes a 1:1-copolymer of CMS and styrene, [(—$CH_2$—CH{$C_6H_4CH_2Cl$})$_n$—(—$CH_2$—CH{$C_6H_5$})$_m$] where n is approximately 45 and m is approximately 45 using TEMPO (52 mg, 0.333 mmol), BPO (73 mg, 0.303 mmol), styrene (5.0 g, 48 mmol) and CMS (7.32 g, 48 mmol) at 130° C. for 4 hours. The recovered co-poly (chloromethylstyrene-styrene) is 6 g (48.7% yield) has a $M_w$=13,900, $M_n$=11,400 and PD=1.22.

Alternatively, poly(chloromethylstyrene) or poly(vinylbenzyl chloride) as a 60:40 mixture of meta- and para-$CH_2Cl$ isomers can be purchased from Sigma Aldrich, Cat. Nos. 182532-25G and -50G. Poly(styrene-co-chloromethylstyrene) is available as 659177-5G and poly(styrene-co-4-chloromethylstyrene-co-4-methoxymethylstyrene) is available as 665789-1G.

Example N

Polystyrene-block-polybutadiene. Styrene is freshly vacuum distilled before use and collected in a 250-mL Schlenk flask that is then back-purged with argon. Anhydrous cyclohexane is used as-received from Aldrich. A 100-mL graduated cylinder equipped with a red rubber suba-seal septum and purged with argon is used to collect and quantify reagents which are then transferred via a double ended needle cannula under argon. Cyclohexane (200 mL) is added to an argon purged, 1-L beverage bottle that had been equipped with a stir bar and then capped with a red rubber suba-seal septum. The reaction vessel is situated in an ice bath and 1.6 M n-butyllithium (10 mL) is added with an air-tight, 50-mL syringe. Then, with stirring, styrene (35 mL, 30.19 g) in cyclohexane (65 mL) is added and the ice bath is allowed to warm to 23° C. After 15 hours with constant stirring, the orange reaction mixture is again cooled in an ice bath, and butadiene (37 mL, 24.59 g) in cyclohexane (60 mL) is then added with stirring. Ice bath cooling is maintained such that the reaction mixture remained clear and free from turbidity due to frozen cyclohexane. The then yellow reaction mixture is gradually allowed to warm to 23° C. with constant stirring, and the reaction is allowed to continue at 23° C. for another 17 hours. Methanol (10 mL) is added via a syringe and the reaction mixture is added to methanol (3 L) and dry ice using a WARING™ blender to chop the coagulated polymer which is then collected by filtration and then air-dried. The polymer in methylene chloride is then re-precipitated into methanol using a WARING™ blender, collected by filtration and then air-dried to obtain 51.62 grams of a white rubbery polymer (51.62/54.78=94.2% yield). The product is expected to be a 20,000-polystyrene-block-12,000-polybutadiene, and to be 44.9 wt. % butadiene.

Example O

Diimide Hydrogenation of Polystyrene-block-polybutadiene. A 1-L, 3-neck flask equipped with a reflux condenser, mechanical stirrer, and argon inlet, is situated in a heated oil bath. The block copolymer (20 g) prepared as described above is added in ortho-xylene (500 mL) and then tri-n-propylamine (47.6 g, 2 mol equivalents) and p-toluenesulfonylhydrazide (62.03 g, 2 mol equivalents) are added. The reaction is boiled at reflux for 16 hours. The mixture is added to methanol (3 L) and dry ice using a WARING™ blender to chop the polymer, which is then isolated by filtration, washed with water, and then with methanol. The polymer collected by filtration is vacuum-dried to obtain 16.54 g of white polymer crumbs (82.7% yield). This process is described in Stephen F. Hahn, "*An Improved Method for the Diimide Hydrogenation of Butadiene and Isoprene Containing Polymers*," Journal of Polymer Science: Part A: Polymer Chemistry, Vol. 30, 397-408 (1992). © 1992 John Wiley & Sons, Inc.

Example P

Chloromethylation of Poly(styrene-block-polyethylene-co-butylene). A 500-mL, 3-neck flask equipped with a reflux condenser, addition funnel, mechanical stirrer, and argon inlet, is situated in a heated oil bath. The hydrogenated block polymer (10 g) prepared as described above is dissolved in dichloromethane (103 g) in a 250-mL jar and roll milled. A solution of chloromethyl ether in methyl acetate is made by adding acetyl chloride (42 mL, 45.9 g) to a mixture of dimethoxymethane (60 mL, 51.29 g) and methanol (1.6 mL) to a 500-mL, 3-neck flask situated in an oil bath and equipped with a condenser, mechanical stirrer, argon inlet and addition funnel. To this mixture is added dichloromethane (100 mL). To the addition funnel equipped with a rubber septum and containing 25 mL of dichloromethane is added via syringe, tin tetrachloride (0.5 mL), and this solution is added drop-wise to the reaction mixture at a rate that is slow enough to control the sudden, vigorous reflux that occurs soon after a portion of the tin tetrachloride solution is added. After the addition is complete and refluxing subsides, the mixture is heated to 50° C. and the poly(styrene-block-ethylene-random-butylene) milky emulsion in dichloromethane (113 g) is added all at once with vigorous stirring. Dichloromethane (two times 20 mL) is used to complete the transfer of the polymer emulsion in the jar to the reaction mixture. Then the oil bath temperature is maintained at 50° C. and boiling at reflux with stirring is continued for 44 hours. After cooling to 23° C., methanol (about 50 mL) is added via a squirt bottle until the mixture turns from red to colorless. The solvent is partly removed using a rotary evaporator until a solid coagulates with the consistency of taffy. The solid is blended with 250 mL of methanol using a WARING™ blender with a VARIAC™ to control the stirring speed, and the particulates are filtered, washed with methanol and dried. The $C^{13}$ NMR is consistent with poly-chloromethylstyrene-random-styrene-20k-block-polyethylene. The total mass of product is 11.29 g. This material is allowed to react with dimethylamine and diethylamine to form an amine-substituted polymer.

Example Q

Reaction of Dimethylamine and Poly(4-vinylbenzyl chloride). Tetrahydrofuran (THF) is distilled from sodium-benzophenone ketyl under argon. To a 1-liter, 3-neck flask equipped with a dry ice condenser and a magnetic stirrer and situated in a dry ice-isopropanol bath is condensed anhydrous dimethylamine (100 mL) into freshly distilled THF (200 mL). Poly(vinylbenzyl chloride) (10 g) in freshly distilled tetrahydrofuran (100 mL) is then added dropwise. After 4 hours, the reaction mixture is transferred to a Parr pressure reactor and stirring is continued for 48 hours at room temperature. After concentrating the reaction mixture using a rotary evaporator, the polymer is precipitated into methanol using a WARING™ blender, filtered and vacuum dried. The polymer is then treated with 0.1 N NaOH, washed with water and then methanol, filtered and vacuum dried to yield 10 grams of poly(4-dimethylaminomethylstyrene).

Example R

Reaction of 2-M Dimethylamine in THF with Poly(4-vinylbenzyl chloride). To a 0.5-L Parr pressure reactor is added 2-molar dimethylamine in THF (200 mL). Poly(vinylbenzyl chloride) (10 g) in freshly distilled tetrahydrofuran (200 mL) is then added. The Parr vessel is sealed under argon and stirring is continued for 48 hours at room temperature. After concentrating the reaction mixture using a rotary evaporator, the mixture is added to methanol using a WARING™ blender to precipitate the polymer that is filtered and vacuum dried. The polymer is then treated with 0.1 N NaOH, washed with water and then methanol, filtered and vacuum dried to yield 10 grams of poly(4-dimethylaminomethylstyrene).

Example S

Reaction of Diethylamine and Poly(4-vinylbenzyl chloride). To a 1-liter, 3-neck flask equipped with a condenser and a magnetic stirrer and situated in a dry ice-isopropanol bath is added anhydrous diethylamine (100 mL) into freshly distilled THF (200 mL). Poly(vinylbenzyl chloride) (10 g) in freshly distilled tetrahydrofuran (100 mL) is then added dropwise. After 4 hours, the reaction mixture is transferred to a PARR™ pressure reactor and stirring is continued for 48 hours at room temperature. After concentrating the reaction mixture using a rotary evaporator, the polymer is precipitated into methanol using a WARING™ blender, filtered and vacuum dried. The polymer is then treated with 0.1 N NaOH, washed with water and then methanol, filtered, and vacuum dried to yield 11 grams of poly(4-diethylaminomethylstyrene).

Example T

Emulsion Polymerization of 80 Wt. % Vinylbenzyl Chloride and 20 Wt. % Divinylbenzene with Potassium Persulfate. Vinylbenzyl chloride (VBC, Dow Specialty Monomers) and divinylbenzene (Sigma-Aldrich, Cat. No. 414565-1L) are vacuum distilled using a WELCH (model 14208-01) belt drive vacuum pump. Deionized water is sparged with argon for 30 minutes before use. To a 3-neck, 2-L, round-bottom flask situated in an oil bath and equipped with a mechanical stirrer, condenser, argon inlet, and sparge tube is placed 500-mL water, 0.4 g potassium persulfate (Sigma-Aldrich, Cat. No. 216224-100G), 0.4 g sodium hydrogen phosphate ($Na_2HPO_4$, sodium phosphate dibasic, anhydrous, EM Science, Cat. No. S X0720-1), and 4 g sodium dodecyl sulfate (dodecyl sulfate, sodium salt, Aldrich, Cat. No. 86,201-0). After this mixture is dissolved, a mixture of vinylbenzyl chloride (80 g) and divinylbenzene (20 g) is added. After 30 minutes at 23° C. with argon sparging, the sparge tube is replaced with a stopper, and the reaction mixture is stirred at 40° C. for 16 hours, and then at 50° C. for 4 more hours under argon. The emulsion is transferred to a partly filled dialysis membrane tube (Spectra/Por® MWCO: 12-14,000, part number 132680, Spectrum Laboratories, Inc., 120-mm wide, 76-mm diameter) and is dialyzed for 1 week in a 5-gallon bucket of water with frequent water changes. The dialyzed emulsion is then freeze-dried (using a Labconco Freeze Dry/Shell Freeze System, FREEZONE 6®) to obtain 80 g of white particles (80% yield, with particle sizes between 30 and 70 nm in diameter). The crosslinked particles are then allowed to react with excess dimethylamine or alternatively diethylamine.

If 4-vinylbenzene is used, this monomer is first washed with 0.05 wt. % NaOH (200 mL), then with water (200 mL) in a separatory funnel, followed by filtration of the bottom layer through neutral alumina, before being introduced into the polymerization reaction.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of scavenging acid in a lithium-ion electrochemical cell, the method comprising:
   contacting an electrolyte solution that contains an acid or is capable of forming the acid with an acid scavenging polymer comprising a polymeric backbone and a nitrogen-containing acid-trapping moiety selected from the group consisting of: an amine group, a pyridine group, and combinations thereof, so that the nitrogen-containing acid-trapping moiety scavenges acidic species present in the electrolyte solution by participating in a Lewis acid-base neutralization reaction,
   wherein the electrolyte solution comprises a lithium salt and one or more solvents and is contained in the electrochemical cell that further comprises a first electrode, a second electrode having an opposite polarity from the first electrode, and a porous separator,
   wherein the polymeric backbone is a homopolymer that comprises a monomer selected from the group consisting of: divinylbenzene, styrene, α-methyl styrene, isoprene, butadiene, propylene, ethylene, acetylene, butylene, isobutylene, ethyleneimine, vinylidene fluoride, vinyl fluoride, and tetrafluoroethylene and
   wherein the nitrogen-containing acid-trapping moiety is grafted as a pendant group onto the polymeric backbone and the acid scavenging polymer is one or more of coated on pores of the porous separator, coated within pores of the first electrode, and coated on pores of the second electrode; and
   cycling lithium ions through the separator and electrolyte solution between the first electrode and the second electrode, wherein acidic species generated are scavenged by the acid scavenging polymer comprising the nitrogen-containing acid-trapping moiety.

2. The method of claim 1, wherein the nitrogen-containing acid-trapping moiety is selected from the group consisting of: 2-vinylpyridine, 3-vinylpyridine, 4-vinylpyridine, dimethylaminomethylstyrene, diethylaminomethylstyrene, vinylpyridine-4-acetamide, vinylphenanthroline, vinylphenylenediamine, 1,10-phenanthroline, vinyl-1,10-phenanthroline, 1,10-phenanthroline-5,6-dione, vinyl-1,10-phenanthroline-5,6-dione, (dimethylamino)pyridine, alkyleneamines, 7-azaindole-pyridine vinyl(dimethylaminomethyl)pyridine, tolylpyridine, vinyl(diethylaminomethyl)pyridine, 4-(dimethylamino)pyridine, 2-(3-aminophenyl)pyridine, 1,8-naphthyridine, poly(2,3,5,6-pyridine), poly(2,5-pyridine), poly(3,5-pyridine), poly(isopropenylpyridine), poly(4-(dimethylaminomethyl)vinylpyridine), poly[2-(3-aminophenyl)pyridine], poly(1,8-naphthyridine), poly(2,3,5,6-pyridine), poly(2,5-pyridine), poly(3,5-pyridine), dialkylamines, poly(divinylbenzene-co-vinylbenzyldimethylamine), poly(divinylbenzene-co-vinylbenzyldiethylamine), isomers and derivatives and combinations thereof.

3. The method of claim 1, wherein the polymeric backbone comprises divinylbenzene and the nitrogen-containing acid-trapping moiety comprises 4-vinylpyridine.

4. The method of claim 3, wherein the acid scavenging polymer has greater than or equal to about 40% to less than or equal to about 100% by mass 4-vinylpyridine and greater than or equal to about 0% to less than or equal to about 40% cross-linked divinylbenzene.

5. The method of claim 4, wherein the first electrode comprises manganese, the lithium salt comprises lithium hexafluorophosphate, and the lithium-ion electrochemical cell is capable of retaining 80% of its initial charge capacity after 100 cycles during cycling with 100% depth-of-discharge at a rate corresponding to 3 hours charging or discharging time.

6. The method of claim 4, wherein the electrolyte solution is a non-aqueous liquid electrolyte solution.

7. An electrochemical device comprising:
   a first electrode;
   a second electrode having an opposite polarity from the first electrode;
   a porous separator;
   an electrolyte solution comprising an acid or a component capable of forming an acid, a lithium salt, and one or more solvents; and
   an acid scavenging polymer capable of scavenging low acid concentrations of less than or equal to about 10 ppm, the acid scavenging polymer comprising a polymeric backbone and a nitrogen-containing acid-trapping moiety coupled thereto, wherein the nitrogen-containing acid-trapping moiety is selected from the group consisting of: vinylpyridine-4-acetamide, vinylphenanthroline, vinylphenylenediamine, 1,10-phenanthroline, vinyl-1,10-phenanthroline, 1,10-phenanthroline-5,6-dione, vinyl-1,10-phenanthroline-5,6-dione, poly(divinylbenzene-co-vinylbenzyldimethylamine), poly(divinylbenzene-co-vinylbenzyldiethylamine), and combinations thereof and the nitrogen-containing acid trapping moiety is capable of participating in a Lewis acid-base neutralization reaction with the acid, wherein the polymeric backbone is a homopolymer that comprises a monomer selected from the group consisting of: divinylbenzene, styrene, α-methyl styrene, isoprene, butadiene, propylene, ethylene, acetylene, butylene, isobutylene, ethyleneimine, vinylidene fluoride, vinyl fluoride, and tetrafluoroethylene, wherein the nitrogen-containing acid trapping moiety is grafted as a pendant group onto the polymeric backbone and the acid scavenging polymer is one or more of coated on pores of the porous separator, coated on pores of the first electrode, and coated on pores of the second electrode, and wherein at least one of the first electrode, second electrode, or separator comprises the acid scavenging polymer.

8. The electrochemical device of claim 7, wherein the nitrogen-containing acid-trapping moiety comprises 4-vinylpyridine.

9. The electrochemical device of claim 7, wherein the polymeric backbone comprises divinylbenzene and the nitrogen-containing acid-trapping moiety comprises vinylpyridine.

10. The electrochemical device of claim 7, wherein the acid scavenging polymer has greater than or equal to about 40% to less than or equal to about 100% by mass 4-vinylpyridine and greater than or equal to about 0% to less than or equal to about 40% cross-linked divinylbenzene.

11. The electrochemical device of claim 7, wherein the first electrode comprises manganese, the lithium salt comprises lithium hexafluorophosphate, and the electrochemical cell is capable of retaining 80% of its initial charge capacity after 100 cycles during cycling with 100% depth-of discharge at a rate corresponding to 3 hours charging or discharging time.

12. The electrochemical device of claim 7, wherein the acid scavenging polymer is provided in one or more of the following:
the polymeric backbone forms the porous separator;
the acid scavenging polymer is coated on or disposed within pores of the porous separator;
the acid scavenging polymer is coated on or disposed within pores of the first electrode;
a binder in the first electrode comprises the acid scavenging polymer;
the acid scavenging polymer is coated on or disposed within pores of the second electrode; or
a binder in the second electrode comprises the acid scavenging polymer.

13. The electrochemical device of claim 7, wherein the polymeric backbone is a polymeric backbone comprising divinylbenzene and the nitrogen-containing acid trapping moiety comprises 4-vinylpyridine.

14. A method of scavenging acid in a lithium-ion electrochemical cell, the method comprising:
contacting an electrolyte solution that contains an acid or is capable of forming the acid with an acid scavenging homopolymer comprising a backbone,
wherein a nitrogen-containing acid-trapping moiety is grafted as a pendant group onto the backbone selected from the group consisting of: an amine group, a pyridine group, and combinations thereof, so that the nitrogen-containing acid-trapping moiety scavenges acidic species present in the electrolyte solution by participating in a Lewis acid-base neutralization reaction,
wherein the electrolyte solution comprises a lithium salt and one or more solvents and is contained in the electrochemical cell that further comprises a first electrode, a second electrode having an opposite polarity from the first electrode, and a porous separator; and
cycling lithium ions through the separator and electrolyte solution between the first electrode and the second electrode, wherein acidic species generated are scavenged by the acid scavenging homopolymer comprising the nitrogen-containing acid-trapping moiety.

15. The method of claim 14, wherein the backbone is formed from a monomer selected from the group consisting of: vinyl alcohol, vinyl acetate, divinylbenzene, styrene, α-methyl styrene, isoprene, butadiene, propylene, ethylene, acetylene, butylene, isobutylene, ethylene oxide, propylene oxide, ethyleneimine, methyl methacrylate, t-butyl methacrylate, methacrylic acid, r-caprolactone, dimethylsiloxane, n-butyl methacrylate, vinylidene fluoride, vinyl fluoride, and tetrafluoroethylene.

\* \* \* \* \*